US011538172B2

(12) United States Patent
Matsuda et al.

(10) Patent No.: US 11,538,172 B2
(45) Date of Patent: Dec. 27, 2022

(54) IMAGE TRACKING APPARATUS

(71) Applicant: Panasonic Intellectual Property Management Co., Ltd., Osaka (JP)

(72) Inventors: Junpei Matsuda, Osaka (JP); Kiyokazu Sasaki, Nara (JP); Mitsuyoshi Okamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 8 days.

(21) Appl. No.: 17/324,552

(22) Filed: May 19, 2021

(65) Prior Publication Data
US 2021/0366131 A1 Nov. 25, 2021

(30) Foreign Application Priority Data

May 22, 2020 (JP) .............................. JP2020-089692

(51) Int. Cl.
*G06T 7/20* (2017.01)
*G06T 7/246* (2017.01)
(Continued)

(52) U.S. Cl.
CPC ............... *G06T 7/246* (2017.01); *G06T 7/60* (2013.01); *G06T 7/70* (2017.01); *G06V 40/10* (2022.01);
(Continued)

(58) Field of Classification Search
CPC .. G06T 7/246; G06T 7/60; G06T 7/70; G06T 2207/10016; G06T 2207/20104;
(Continued)

(56) References Cited

U.S. PATENT DOCUMENTS

2007/0013791 A1  1/2007 Kinoshita
2012/0206619 A1  8/2012 Nitta
(Continued)

FOREIGN PATENT DOCUMENTS

JP  2007-042072 A  2/2007
JP  2011-166305 A  8/2011
(Continued)

OTHER PUBLICATIONS

Machine translation for JP 2011-166305, IDS (Year: 2011).*
JP Office Action dated Jul. 14, 2020 issued in JP Patent Appln. No. 2020-089692 with its machine translation by the JPO.

*Primary Examiner* — Qian Yang
(74) *Attorney, Agent, or Firm* — Renner, Otto, Boisselle & Sklar, LLP

(57) ABSTRACT

An image tracking apparatus, which tracks a subject in a moving image, comprising: an image acquisition device that acquires image data indicating the moving image; a first detector that detects a first area of a subject in acquired image data to track the first area in the moving image; a second detector that detects a second area of a subject in the image data to track the second area in the moving image; and a controller that tracks the subject by switching between a tracking result of the first detector and a tracking result of the second detector. The first and the second detector operate independently. The controller tracks the subject using the tracking result of the first detector when the first area is tracked, and tracks the subject using the tracking result of the second detector when the first area is not tracked and the second area is tracked.

15 Claims, 19 Drawing Sheets

(51) Int. Cl.
　　　*G06T 7/70*　　　(2017.01)
　　　*G06T 7/60*　　　(2017.01)
　　　*H04N 5/232*　　(2006.01)
　　　*G06V 40/10*　　(2022.01)
　　　*G06V 40/16*　　(2022.01)

(52) U.S. Cl.
　　　CPC ....... *G06V 40/161* (2022.01); *H04N 5/23219* (2013.01); *G06T 2207/10016* (2013.01); *G06T 2207/20104* (2013.01); *G06T 2207/30201* (2013.01)

(58) Field of Classification Search
　　　CPC .......... G06T 2207/30201; G06V 40/10; G06V 40/161; G06V 10/75; H04N 5/23219; H04N 5/232; H04N 5/232127; H04N 5/232935; H04N 5/232945; G01S 5/16; G06K 9/6201
　　　See application file for complete search history.

(56) References Cited

U.S. PATENT DOCUMENTS

| | | | |
|---|---|---|---|
| 2013/0004020 A1 | 1/2013 | Yoneyama | |
| 2016/0267634 A1* | 9/2016 | Nam | ................ G06V 20/35 |
| 2017/0075993 A1* | 3/2017 | Matsushita | ............ G06V 40/20 |

FOREIGN PATENT DOCUMENTS

| | | |
|---|---|---|
| JP | 2012-156704 A | 8/2012 |
| JP | 2013-012941 A | 1/2013 |
| JP | 2019-022116 A | 2/2019 |

\* cited by examiner

Fig. 4A

| MAIN SUBJECT INFORMATION | |
|---|---|
| POSITION | SIZE |
| (Xm1, Ym1) | Wm1, Hm1 |

| FACE TRACKING INFORMATION | | |
|---|---|---|
| FACE AREA | POSITION | SIZE |
| Rf1 | (Xf1, Yf1) | Wf1, Hf1 |
| ⋮ | ⋮ | ⋮ |

| HEAD TRACKING INFORMATION | | |
|---|---|---|
| HEAD AREA | POSITION | SIZE |
| Rh1 | (Xh1, Yh1) | Wh1, Hh1 |
| ⋮ | ⋮ | ⋮ |

D4

IMAGE TRACKING APPARATUS

BACKGROUND

1. Technical Field

The present disclosure relates to an image tracking apparatus that tracks a subject in image data.

2. Related Art

JP 2013-12941 A discloses a tracking apparatus that tracks a subject using two areas in image data. The tracking apparatus of JP 2013-12941 A includes a face tracking unit that tracks a face of the subject and a peripheral tracking unit that tracks a peripheral part other than the face such as the chest, and switches to tracking of the peripheral part when it is unable to track the face. The peripheral part to be tracked by the peripheral tracking unit is set by a positional relation such as a position below the face by a preset distance. As a result, the tracking apparatus of JP 2013-12941 A returns to tracking of the face when the face or color information of a skin color corresponding to the face is detected at an estimated position, which is based on a presumption that the face locates the preset distance above the peripheral part that is being tracked.

SUMMARY

The present disclosure provides an image tracking apparatus capable of improving the accuracy of tracking a subject in image data.

An image tracking apparatus, which tracks a subject in a moving image in which the subject is captured, comprising an image acquisition device, a first detector, a second detector, and a controller. The image acquisition device acquires image data indicating the moving image. The first detector detects a first area of at least one subject in acquired image data to track the first area in the moving image. The second detector detects a second area of at least one subject in the image data to track the second area in the moving image. The controller tracks the subject by switching between a tracking result of the first area by the first detector and a tracking result of the second area by the second detector. The first detector and the second detector operate independently of each other. The controller tracks the subject using the tracking result of the first detector when the first area is tracked by the first detector. The controller tracks the subject using the tracking result of the second detector when the first area is not tracked by the first detector and the second area is tracked by the second detector.

An image tracking apparatus, which tracks a subject in a moving image in which the subject is captured, comprising an image acquisition device, a plurality of detectors, and a controller. The image acquisition device acquires image data indicating the moving image. Each of the plurality of detectors detects an area of at least one subject in acquired image data to track the detected area in the moving image. The controller tracks the subject by switching among tracking results of the areas of the subject obtained by each of the plurality of detectors. The plurality of detectors include at least a first detector that detects a first area as an area of the subject and a second detector that detects a second area as an area of the subject. An operation period with which the first detector detects the first area is shorter than an operation period with which the second detector detects the second area. The controller tracks the subject using a tracking result of the first detector when the first area is tracked by the first detector. The controller tracks the subject using a tracking result of the second detector when the first area is not tracked by the first detector and the second area is tracked by the second detector. After switching to the tracking result of the second detector, the controller switches from the tracking result of the second detector to the tracking result of the first detector upon tracking the first area by the first detector.

An image tracking apparatus, which tracks a subject in a moving image in which the subject is captured, comprising an image acquisition device, a first detector, a second detector, and a controller. The image acquisition device acquires image data indicating the moving image. The first detector detects a first area of at least one subject in acquired image data to track the first area in the moving image. The second detector detects a second area of at least one subject in the image data to track the second area in the moving image. The controller tracks the subject by switching between a tracking result of the first area by the first detector and a tracking result of the second area by the second detector. An operation period with which the first detector detects the first area and an operation period with which the second detector detects the second area are the same. The controller tracks the subject using a tracking result of the first detector when the first area is tracked by the first detector. The controller tracks the subject using a tracking result of the second detector when the first area is not tracked by the first detector and the second area is tracked by the second detector. After switching to the tracking result of the second detector, the controller continues tracking the subject using the tracking result of the second detector when the first area is tracked by the first detector with the second detector tracking the second area.

According to the image tracking apparatus of the present disclosure, the accuracy of tracking the subject in the image data can be improved using the tracking result of the first area by the first detector and the tracking result of the second area by the second detector.

BRIEF DESCRIPTION OF THE DRAWINGS

FIGS. 4A to 4C are views illustrating data held by the digital camera in the subject tracking processing;

DETAILED DESCRIPTION

Hereinafter, embodiments will be described in detail with reference to the drawings as appropriate. However, detailed descriptions more than necessary will be omitted in some cases. For example, detailed descriptions of already well-known matters and duplicate descriptions for substantially the same configuration will be omitted in some cases. A reason thereof is to avoid unnecessary redundancy of the following description and to facilitate the understanding of those skilled in the art. The inventor(s) provides the accompanying drawings and the following description in order for those skilled in the art to fully understand the present disclosure, and does not intend to limit the subject described in the claims by these.

First Embodiment

In a first embodiment, as an example of an image tracking apparatus according to the present disclosure, a digital camera that detects a face and a head of a subject based on an image recognition technique and tracks the subject using detection results of the face and head will be described.

1-1. Configuration

Figure 1:
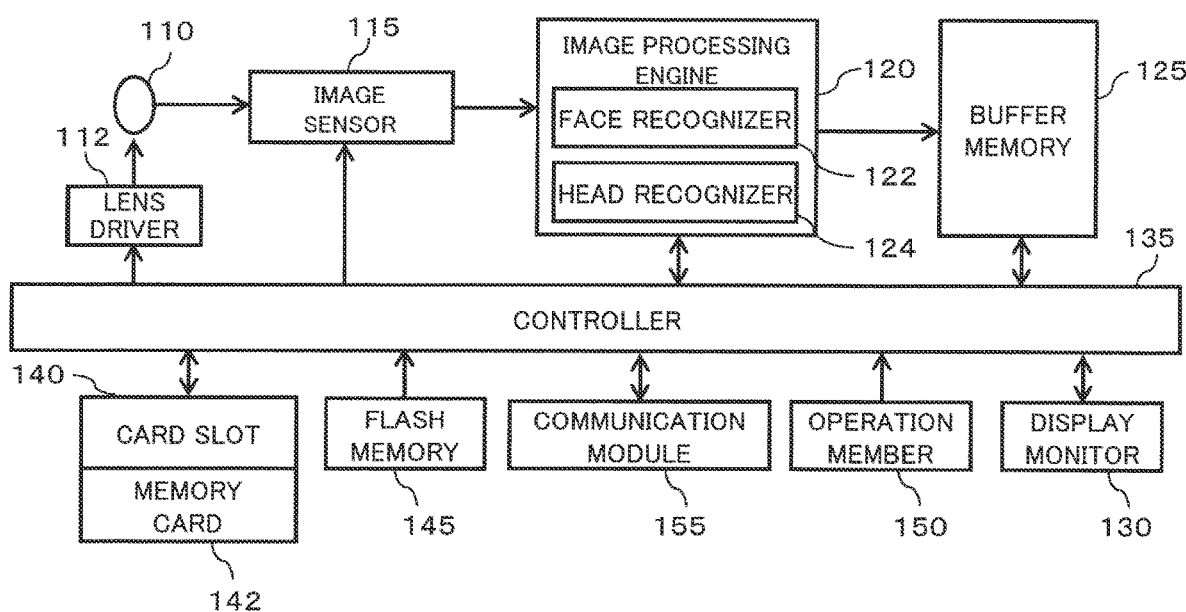
FIG. 1 is a diagram illustrating a configuration of a digital camera according to a first embodiment.

FIG. 1 is a diagram illustrating a configuration of a digital camera 100 according to the present embodiment. The digital camera 100 of the present embodiment includes an image sensor 115, an image processing engine 120, a display monitor 130, and a controller 135. Further, the digital camera 100 includes a buffer memory 125, a card slot 140, a flash memory 145, an operation member 150, and a communication module 155. In addition, the digital camera 100 includes, for example, an optical system 110 and a lens driver 112.

The optical system 110 includes a focus lens, a zoom lens, an optical image stabilization lens (OIS), an aperture, a shutter, and the like. The focus lens is a lens configured to change a focus state of a subject image formed on the image sensor 115. The zoom lens is a lens configured to change the magnification of the subject image formed by the optical system. Each of the focus lens and the like is configured using one or a plurality of lenses.

The lens driver 112 drives the focus lens and the like in the optical system 110. The lens driver 112 includes a motor to move the focus lens along an optical axis of the optical system 110 under the control of the controller 135. A configuration for driving the focus lens in the lens driver 112 can be realized by a DC motor, a stepping motor, a servo motor, an ultrasonic motor, or the like.

The image sensor 115 captures the subject image formed via the optical system 110 and generates captured data. The captured data constitutes image data indicating an image captured by the image sensor 115. The image sensor 115 generates image data of a new frame at a predetermined frame rate (e.g., 30 frames/second). The generation timing of captured data and an electronic shutter operation of the image sensor 115 are controlled by the controller 135. As the image sensor 115, various image sensors, such as a CMOS image sensor, a CCD image sensor, and an NMOS image sensor, can be used.

The image sensor 115 performs an operation of capturing a moving image or a still image and an operation of capturing a through image, and the like. The through image is mainly a moving image, and is displayed on the display monitor 130 so that a user determines a composition to capture a still image, for example. The through image is an example of a moving image in the present embodiment. The image sensor 115 is an example of an image acquisition device configured as an imager in the present embodiment.

The image processing engine 120 performs various types of processing on captured data output from the image sensor 115 to generate image data, or performs various types of processing on image data to generate an image to be displayed on the display monitor 130. Examples of the various types of processing include white balance correction, gamma correction, YC conversion processing, electronic zoom processing, compression processing, decompression processing, and the like, but are not limited thereto. The image processing engine 120 may be configured using a hard-wired electronic circuit, or may be configured using a microcomputer, a processor, or the like using a program.

In the present embodiment, the image processing engine 120 includes a face recognizer 122 and a head recognizer 124 that realize a detection function and a tracking function of a subject such as a face and a head of a human by image recognition on a captured image. The face recognizer 122 and the head recognizer 124 are examples of a first detector and a second detector in the present embodiment, respectively.

The face recognizer 122 performs face detection by rule-based image recognition processing such as template matching, for example. The face detection may be performed by various image recognition algorithms. For example, a feature value-based method focusing on a local area of a face such as eyes and mouth can be used. The face recognizer 122 performs face tracking processing based on face detection as will be described later.

The head recognizer 124 detects a head using a learned model by a neural network such as a convolutional neural network. The head recognizer 124 performs head tracking processing based on head detection as will be described later.

The learned model of the head recognizer 124 can be obtained by supervised learning using, as training data, image data associated with a ground truth label, for example. The ground truth is an image showing the head in all directions including the profile and back of the head. The learned model may generate reliability or likelihood related to a detection result. The learned model of the head recognizer 124 is not limited to the neural network, and may be a machine learning model related to various types of image recognition.

In the digital camera 100 of the present embodiment, a learned model of the head recognizer 124 has a heavier processing load than the face recognizer 122 which is rule-based or the like. Thus, the head recognizer 124 is set to have a longer execution period than the face recognizer 122. Accordingly, at a period when the learned model is not being executed, the head recognizer 124 in the present embodiment interpolates a detection result using a detection result of the learned model. The head recognizer 124 may include a motion detector configured to perform the interpolation with high accuracy, for example. The motion detector calculates a change in position in the detector of the learned model using a motion vector between frames of image data, for example.

The face recognizer 122 and the head recognizer 124 may be configured separately from the image processing engine 120, or may be integrally configured with the controller 135. In addition, the face recognizer 122 and the head recognizer 124 may detect and track not only a human but also an animal as a subject.

The display monitor 130 is an example of a display that displays various types of information. For example, the display monitor 130 displays an image (through image) indicated by image data which is captured by the image sensor 115 and subjected to image processing by the image processing engine 120. In addition, the display monitor 130 displays a menu screen or the like for a user to make various settings for the digital camera 100. The display monitor 130 can be configured using, a liquid crystal display device or an organic EL device, for example.

The operation member 150 is a general term for at least one operation interface such as an operation button and an operation dial provided on the exterior of the digital camera 100 to receive a user operation. The operation member 150 includes, a release button, a mode dial, a touch panel of the display monitor 130, a joystick, and the like, for example. When receiving the user operation, the operation member 150 transmits an operation signal corresponding to the user operation to the controller 135.

The controller 135 is a hardware controller and controls the operation of the entire digital camera 100 overall. The controller 135 includes a CPU and the like, and the CPU realizes a predetermined function by executing a program (software). The controller 135 may, in place of the CPU, include a processor configured using a dedicated electronic circuit designed to realize a predetermined function. That is, the controller 135 can be implemented with various processors such as a CPU, an MPU, a GPU, a DSU, an FPGA, and an ASIC. The controller 135 may configured using one or a plurality of processors. In addition, the controller 135 may be configured using one semiconductor chip together with the image processing engine 120 and the like.

The buffer memory 125 is a recording medium that functions as a work memory for the image processing engine 120 and the controller 135. The buffer memory 125 is realized by a dynamic random access memory (DRAM) or the like. The flash memory 145 is a non-volatile recording medium. For example, the buffer memory 125 stores main subject information D0, face tracking information D2, and head tracking information D4, which will be described later.

Although not illustrated, the controller 135 may have various internal memories includes a built-in ROM, for example. Various programs executed by the controller 135 are stored in the ROM. In addition, the controller 135 may include a RAM that functions as a work area of the CPU.

The card slot 140 is a means for inserting a removable memory card 142. The card slot 140 enables electrical and mechanical connection with the memory card 142. The memory card 142 is an external memory having a recording element such as a flash memory inside. The memory card 142 can store data such as image data generated by the image processing engine 120.

The communication module 155 is a communication module (circuit) that performs communication according to the communication standard IEEE 802.11, Wi-Fi standard or the like. The digital camera 100 can communicate with another device via the communication module 155. The digital camera 100 may directly communicate with another device via the communication module 155, or may communicate via an access point. The communication module 155 may be connectable to a communication network such as the Internet.

1-2. Operation

An operation of the digital camera 100 configured as described above will be described.

The digital camera 100 captures a subject image formed via the optical system 110 with the image sensor 115 to generate captured data. The image processing engine 120 performs various types of processing on the captured data generated by the image sensor 115 to generate image data. The controller 135 records the image data generated by the image processing engine 120 in the memory card 142 mounted in the card slot 140, in the operation of capturing the still image, for example.

In addition, the digital camera 100 causes the display monitor 130 to display the through image in the operation of capturing the through image. The user can confirm a composition to capture the still image from the through image of the display monitor 130. The controller 135 performs a focusing operation to control the lens driver 112 that drives the focus lens of the optical system 110, in response to a release button operated by the user, for example.

1-2-1. Outline of Operation

In the above image-capturing operation, the digital camera 100 of the present embodiment performs image recognition on a captured image Im, such as a through image to track a subject in a moving image, for auto-focus (AF) control, for example. For example, a main subject to be focused is continuously identified by the tracking. An outline of the tracking operation of the digital camera 100 according to the present embodiment will be described with reference to FIGS. 2A to 2C.

Figure 2:
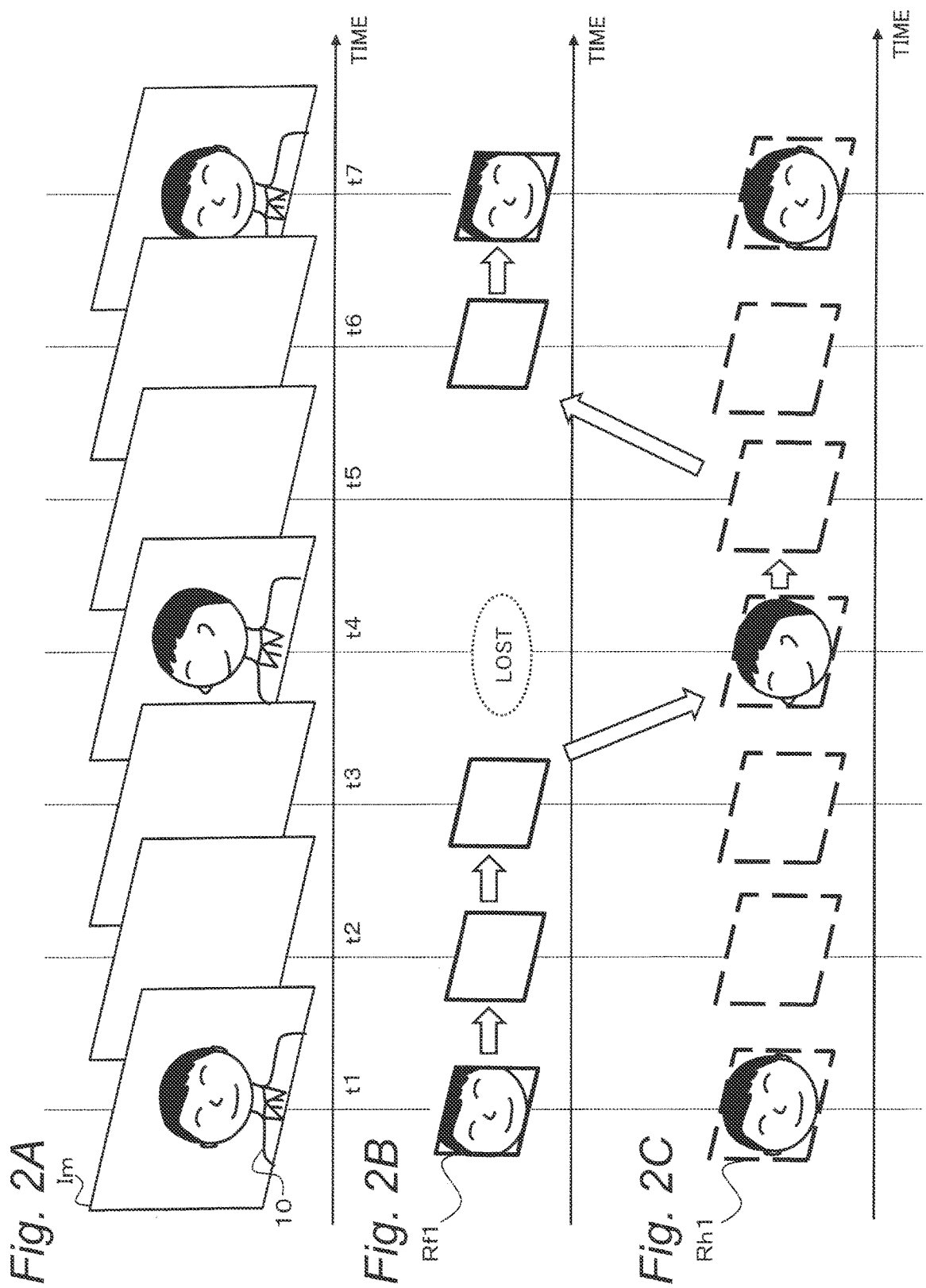
FIGS. 2A to 2C are views for describing an outline of an operation of the digital camera.

FIG. 2A exemplifies a moving image on which a person 10 is captured as the main subject of the digital camera 100, along the time axis. FIG. 2B illustrates a tracking result of the face recognizer 122 in the example of FIG. 2A. FIG. 2C illustrates a tracking result of the head recognizer 124 in the same example.

FIG. 2A illustrates an example in which, from time t1 to time t7, the person 10 turns sideways from a front direction with respect to the digital camera 100 (t1 to t4), and then, faces the front direction again (t4 to t7). Each interval between time t1 to time t7 corresponds to a frame period of the captured image Im, for example. The illustration of the person 10 at times t2, t3, t5, and t6 is omitted in FIGS. 2A to 2C.

As illustrated in FIGS. 2B and 2C, in the digital camera 100 of the present embodiment, the face recognizer 122 and the head recognizer 124 respectively perform the face tracking processing and head tracking processing in parallel. In the face tracking processing, the face recognizer 122 repeats an image recognition process of recognizing a face area Rf1, which is defined on the person 10 in the captured image Im, indicating an area where the face is shown in the captured image Im. In the head tracking processing, the head recognizer 124 repeats an image recognition process of recognizing a head area Rh1, which is defined on the person 10 in the captured image Im, indicating an area where the head is shown in the captured image Im.

From time t1 to time t3 in the examples of FIGS. 2A to 2C, the digital camera 100 of the present embodiment tracks the person 10 as the main subject by using the tracking result by the face recognizer 122. In such a situation, it may occur that although the person 10 is shown in the moving image, the face turning to the front is not shown due to a change of the face orientation or posture of the person 10. In this case, it is anticipated that the face recognizer 122 cannot track the face area (i.e., the face tracking is lost), as illustrated in FIG. 2B.

In such cases, the digital camera 100 of the present embodiment switches to using the tracking result of the head recognizer 124 instead of the tracking result of the face recognizer 122, as illustrated in FIGS. 2B and 2C, at the time t4 when face tracking is lost. At this switching, the digital camera 100 determines whether the tracking result of the face recognizer 122 and the tracking result of the head recognizer 124 indicate an identical subject. For example, in FIGS. 2B and 2C, the face area Rf1 at time t3 corresponds to the face of person 10, and the head area Rh1 at time t4 corresponds to the head including the face of the same person 10. According to this, an identity of the subject can be determined based on a positional relation between the respective areas Rf1 and Rh1.

As described above, even when the face recognizer 122 has difficulty to track the subject due to the face orientation, posture and the like of the person 10, the digital camera 100 of the present embodiment can continuously track the subject using the tracking result of the head recognizer 124.

In addition, when the tracking result of the face recognizer 122 is obtained again during tracking the subject based on the tracking result of the head recognizer 124, the digital camera 100 of the present embodiment returns to the tracking of the subject using the tracking result of the face recognizer 122. In the examples of FIGS. 2B and 2C, the tracking using the tracking result of the face recognizer 122 is performed again from time t6 when the tracking result of the face recognizer 122 is obtained. When returning to using the tracking result of the face recognizer 122, the digital camera 100 determines the identity of the subject, similarly to the case of switching from the tracking result of the face recognizer 122 to that of the head recognizer 124.

According to the digital camera 100 as described above, when the attitude of the subject changes and the tracking result of the face recognizer 122 is not obtained, it is possible to continuously track the specific subject such as the main subject, using the tracking result of the head recognizer 124 that performs the head tracking processing in parallel. As a result, a position of the specific subject in the image data can be continuously obtained, and thus, it is possible to perform a focusing operation with high accuracy, for example.

In the present embodiment, the head recognizer 124 executes the head detection in a period longer than the frame period, for example. The head recognizer 124 may interpolate the tracking result by correcting information of the head area Rh1 at the time of the previous detection using the motion detector, for example. In the examples of FIGS. 2A to 2C, while the tracking result of the face recognizer 122 is obtained correspondingly to the frame period, the head detection is not executed at times t2, t3, t5, and t6. Thus, the tracking results of the head recognizer 124 at such times are interpolated. The head recognizer 124 may interpolate the tracking result using the previous information of the head area Rh1, without performing correction by the motion detector.

1-2-2. Subject Tracking Processing

The digital camera 100 of the present embodiment performs subject tracking processing to track the subject based on the tracking results of the face recognizer 122 and the head recognizer 124 as described above. In the subject tracking processing, the digital camera 100 tracks the main subject based on the tracking results of the respective recognizers 122 and 124, and tracks other subjects as candidates for the main subject. The subject tracking processing in the present embodiment will be described with reference to FIGS. 3 to 5C.

Figure 3:
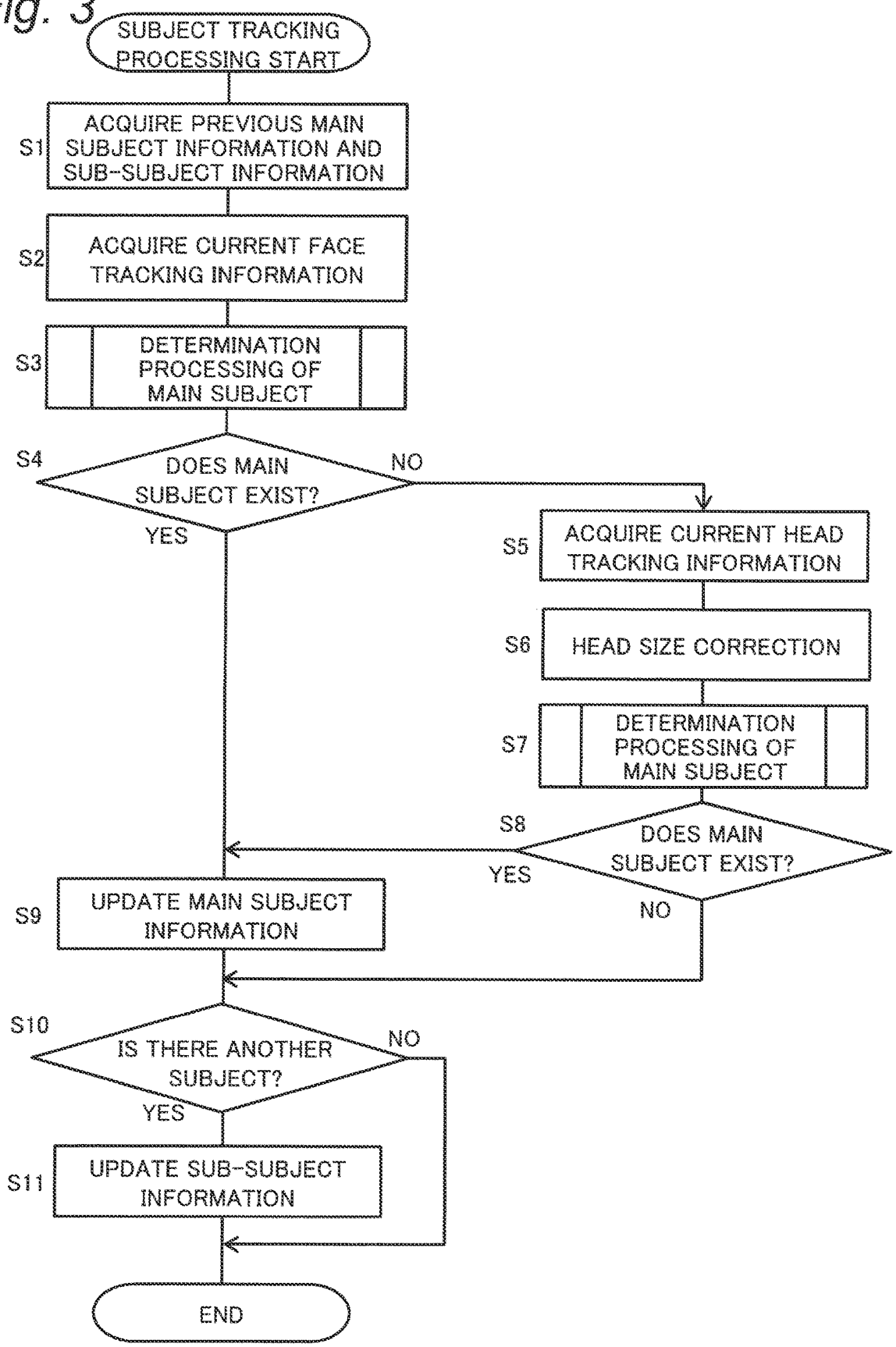
FIG. 3 is a flowchart illustrating subject tracking processing in the digital camera.
Figure 5A:
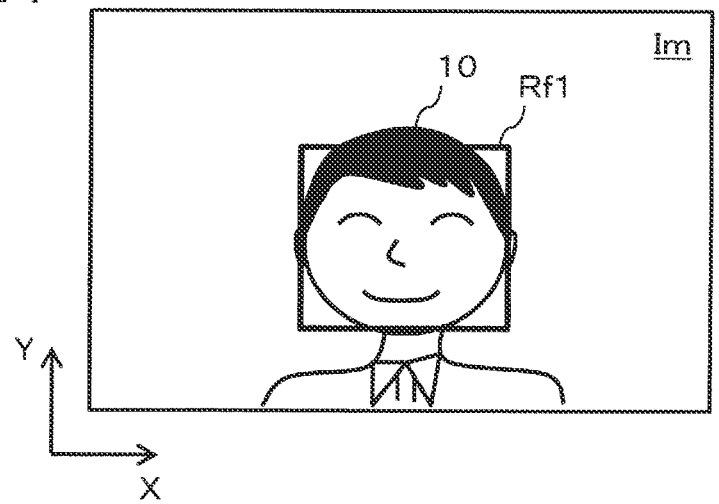
FIGS. 5A to 5C are views for describing the subject tracking processing in the digital camera.
Figure 5B:
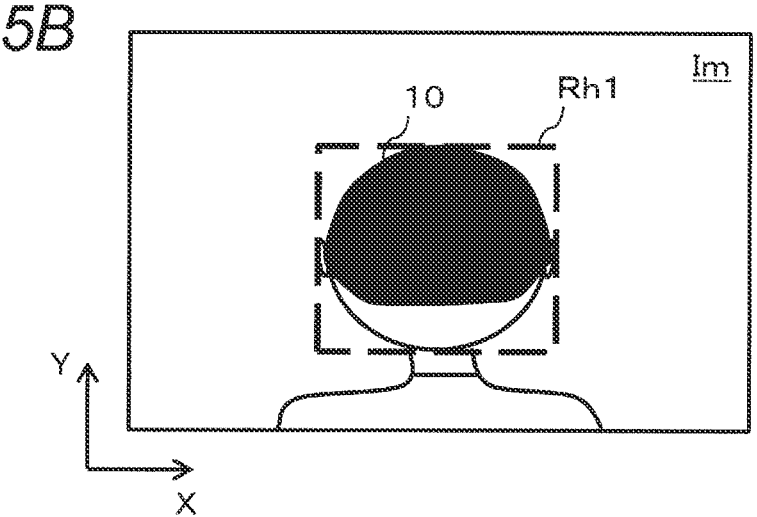
Figure 5C:
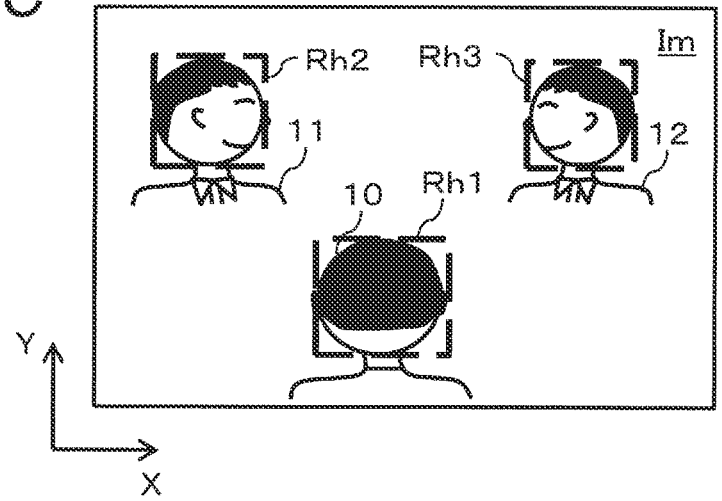

FIG. 3 is a flowchart illustrating the subject tracking processing in the digital camera 100 of the present embodiment. FIGS. 4A to 4C are views illustrating data used by the digital camera 100 in the subject tracking processing. FIGS. 5A to 5C are views for describing the subject tracking processing in the digital camera 100. Hereinafter, a case where the person 10 is the main subject in the captured images Im of FIGS. 5A to 5C will be described as an example.

The subject tracking processing illustrated in the flowchart of FIG. 3 is repeatedly executed in a predetermined period in synchronization with the face tracking processing and the head tracking processing (details will be described later) that are executed in parallel, for example. The predetermined period is the frame period of the captured image Im, for example. Each process of this flowchart is performed by the controller 135 of the digital camera 100, for example.

First, the controller 135 of the digital camera 100 acquires main subject information and sub-subject information related to a previous frame (S1) from the buffer memory 125, for example. The said information is obtained as results of previous subject tracking processing. The main subject information indicates information to identify the main subject. The sub-subject information indicates information on a subject other than the main subject. FIG. 4A exemplifies main subject information D0 acquired in Step S1.

In the present embodiment, the main subject information D0 as illustrated in FIG. 4A and the sub-subject information (not illustrated) are repeatedly updated every time the subject tracking processing is performed. The main subject information D0 includes a position and a size of a face area corresponding to the main subject, for example. The position and size are set according to a previous tracking result of the face recognizer 122. At the time of performing the subject tracking processing for the first time, the main subject information D0 and the sub-subject information can be set based on the tracking result of the face recognizer 122 or the head recognizer 124, for example.

The position of the face area or a head area in the main subject information D0 and the sub-subject information is defined by a horizontal position X and a vertical position Y on the captured image Im, and indicates the center of the rectangular face area Rf1 or head area Rh1, for example. The size of the face area or the head area indicates a width W and a height H of the rectangular face area Rf1 or head area Rh1, for example.

Referring back to FIG. 3, the controller 135 acquires, from the face recognizer 122, face tracking information D2 which is generated in current face tracking processing performed on a current frame as a processing target (S2). The face tracking information D2 is information indicating the tracking result of the face recognizer 122, and includes, as illustrated in FIG. 4B, a position and a size of a face area associated with each other, for example. The face tracking information D2 may include information on a plurality of face areas relating to a plurality of subjects.

The controller 135 performs determination processing of a main subject (S3) for determining the presence or absence of the face area determined as a current main subject. The face area as the current main subject is selected from the face tracking information D2 based on the acquired previous main subject information D0 and current face tracking information D2. The controller 135 compares the position and size of each face area in the current face tracking information D2 with the position and size of the previous main subject information D0. In this way, the controller 135 determines a face area, which can be identified as the same subject as the previous main subject in the face tracking information D2, as the current main subject. Details of determination processing of a main subject (S3) will be described later.

The controller 135 determines whether the main subject exists in the face tracking information D2 (S4) based on a result of determination processing of a main subject (S3).

When determining that the main subject exists in the face tracking information D2 (YES in S4), the controller 135 updates the main subject information D0 based on the position and size of the face area in the face tracking information D2 (S9).

FIG. 5A exemplifies the captured image Im in which there is the face area Rf1 of the person 10 who is the main subject in the face tracking information D2 (YES in S4). In the example of FIG. 5A, the main subject information D0 is updated such that a position (Xm1, Ym1) and sizes Wm1 and Hm1 illustrated in FIG. 4A are rewritten to a position (Xf1, Yf1) and sizes Wf1 and Hf1 of the face area Rf1 illustrated in FIG. 4B (S9).

On the other hand, when determining that the main subject does not exist in the face tracking information D2 (NO in S4), the controller 135 acquires, from the head recognizer 124, the head tracking information D4 which is generated in current head tracking processing performed on a current frame as a processing target (S5). The head tracking information D4 is information indicating the tracking result of the head recognizer 124, and includes, as illustrated in FIG. 4C, a position and a size of a head area associated with each other, for example. The head tracking information D4 may include information on a plurality of head areas similarly to the face tracking information D2.

FIG. 5B illustrates the head area Rh1 of the person 10 in the captured image Im. In the digital camera 100 of the present embodiment, the head area Rh1 is recognized as an area corresponding to the entire head including the face, and thus, has a larger size than the face area Rf1 recognized as an area corresponding only to the face as illustrated in FIG. 5A. Therefore, the controller 135 corrects the size of the head area in the head tracking information D4 to be reduced by a predetermined ratio. This correction is made from the viewpoint of making parts that correspond to the face in various head areas comparable with the face area (S6). The predetermined ratio is a ratio that presumably corresponds to the face part in the entire head, for example (e.g., 90%).

Next, the controller 135 performs determination processing a main subject (S7) similarly to Step S3 using the corrected head tracking information D4 instead of the face tracking information D2 used in Step S3. The controller 135 determines the (corrected) head area, which can be identified as the same subject as the previous main subject, as a current main subject.

The controller 135 determines whether the main subject exists in the corrected head tracking information D4 (S8) based on a result of determination processing of a main subject (S7).

When determining that the main subject exists in the corrected head tracking information D4 (YES in S8), the controller 135 updates the main subject information D0 based on the position and size of the head area in the corrected head tracking information D4 (S9). In the example of FIG. 5B, the main subject information D0 is updated such that the sizes Wm1 and Hm1 illustrated in FIG. 4A are rewritten to sizes corrected in Step S6, which are corrected from sizes Wh1 and Hh1 of the head area Rh1 illustrated in FIG. 4C. In this case, the position (Xm1, Ym1) in the main subject information D0 is rewritten to a position (Xh1, Yh1) of the head area Rh1, for example.

On the other hand, when determining that the main subject does not exist in the head tracking information D4 (NO in S8), the controller 135 proceeds to Step S10.

The controller 135 determines whether there is a subject other than the main subject based on the face tracking information D2 or the head tracking information D4 (S10). For example, when determining that there is the main subject based on the face tracking information D2 (YES in S4), the controller 135 determines the presence or absence of another face area in the face tracking information D2. On the other hand, when determining that there is the main subject based on the head tracking information D4 (YES in S8), the controller 135 determines the presence or absence of another head area in the head tracking information D4.

When determining that there is a subject other than the main subject based on the face tracking information D2 or the head tracking information D4 (YES in S10), the controller 135 updates the sub-subject information based on a face area or a head area regarding as another subject (S11) for each of one or more other subjects. The sub-subject information includes face area or a head area associated with its position and size for each of other subjects. The sub-subject information is updated by a corrected size in Step S6 when there is a head area other than the main subject in the head tracking information D4, for example.

FIG. 5C exemplifies the captured image Im in which there are head areas other than the main subject in the head tracking information D4 (YES in S10). In this example, there are head areas Rh2 and Rh3 in the head tracking information D4 in addition to the head area Rh1 of the main subject, and thus, the sub-subject information is updated according to positions and sizes which are associated with the head areas Rh2 and Rh3 (S11).

After updating the sub-subject information (S11), the controller 135 ends the subject tracking processing on the current frame. In addition, when determining that there is no face area or head area other than the main subject in the face tracking information D2 or the head tracking information D4 (S10), the controller 135 ends the subject tracking processing on the current frame. Thereafter, the processes of Step S1 and the subsequent steps are repeated for the next frame. The main subject is tracked by sequentially updating and managing the main subject information D0 according to the subject tracking processing on each frame.

According to the above subject tracking processing, the main subject determination process (S3) is performed by comparing the previous main subject information D0 and the face tracking information D2, and the main subject information D0 is updated based on the face tracking information D2 (S9) when the main subject exists (YES in S4). When the main subject does not exist in face tracking information D2 (NO in S4), the main subject information D0 is updated based on the head tracking information D4 (S9), in a case where it is determined that the main subject exists (YES in S8) according to determination processing of a main subject using the head tracking information D4 (S7). As a result, the tracking of the main subject can be continued based on the head tracking information D4 even when it is difficult to track the main subject with the face tracking information D2.

In addition, when it is determined in Step S8 that the main subject exists (YES in S8), the main subject information D0 is updated based on the corrected head tracking information D4 (S9). As a result, whether the subject is identical with the face tracking information D2 acquired in the subsequent subject tracking processing, can be determined similarly to the case of updating the main subject information D0 based on the face tracking information D2 (S3). As a result, when the main subject exists in the face tracking information D2 (YES in S4), it is possible to return to the tracking of the subject using the tracking result of the face recognizer 122.

The description is given above regarding the example in which the controller 135 determines whether there is another subject in the face tracking information D2 or the head tracking information D4 in Step S10, depending on the determination in Step S4. The determination on whether there is another subject in Step S10 is not particularly limited thereto, and may be performed based on both the face tracking information D2 and the head tracking information D4, for example.

1-2-3. Determination Processing of Main Subject

Figure 6:
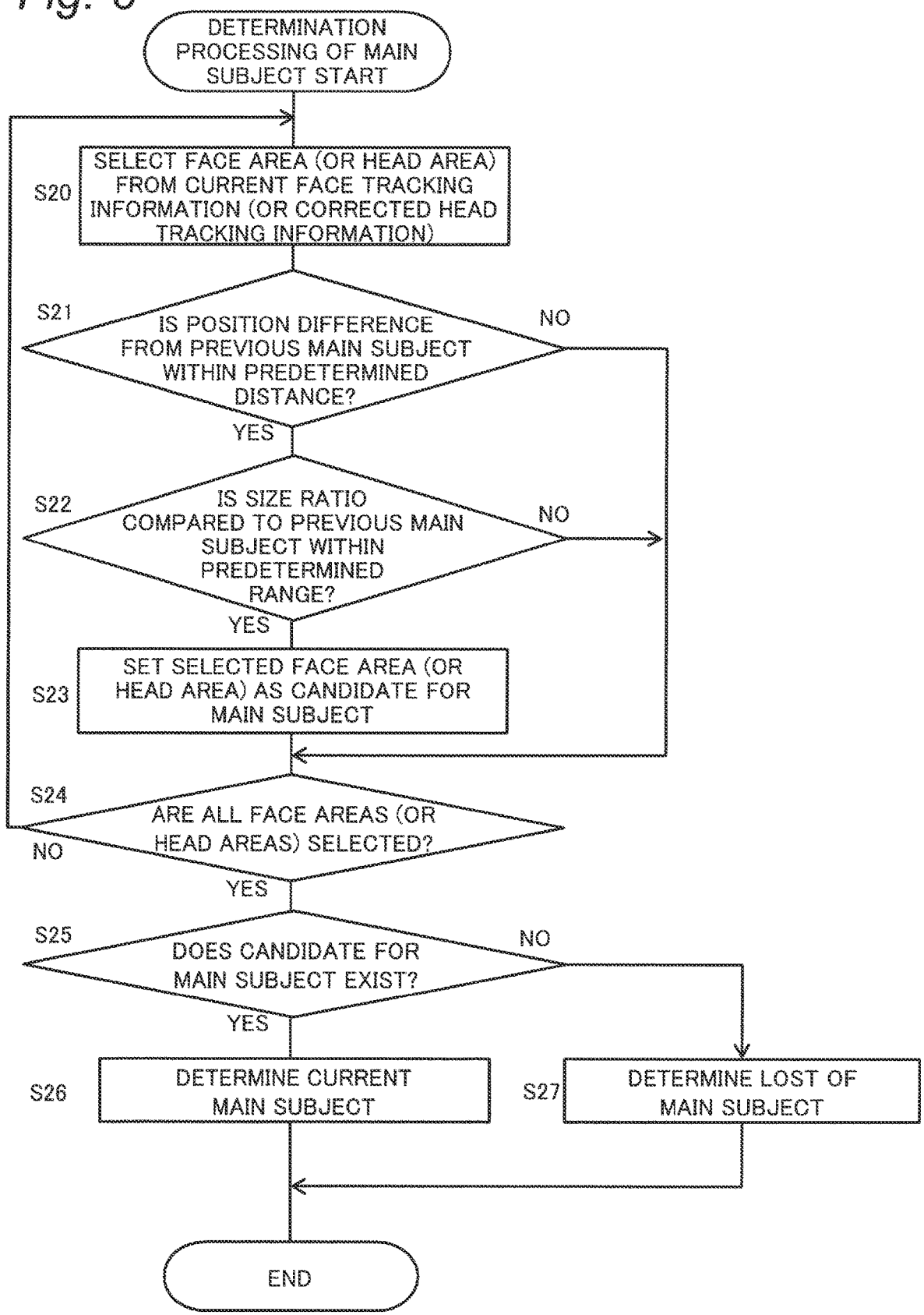
FIG. 6 is a flowchart illustrating determination processing of a main subject in the digital camera.

FIG. 6 is a flowchart illustrating determination processing of a main subject (S3 or S7) in the digital camera 100. Each process according to the flowchart illustrated in FIG. 6 is performed by the controller 135 of the digital camera 100, for example. The processing of this flowchart is performed after acquiring the face tracking information D2 in Step S2 of FIG. 3 and after correcting the size of the head area in the head tracking information D4 in Step S6.

The process of Step S3 starts in a state where the main subject information D0 of a previous frame and the face tracking information D2 of a current frame are held. On the other hand, the process of Step S7 is started in a state where the head tracking information D4 after the size correction (S6) is held, instead of the face tracking information D2 described above.

For example, in the process of Step S3, the controller 135 first selects one face area from the face tracking information D2 (S20).

Next, the controller 135 determines whether a position difference is within a predetermined distance (S21). The position difference is a difference between a position associated with a face area selected in the face tracking information D2 and a position of the previous main subject indicated by the main subject information D0. The predetermined distance is set in advance as a small distance that can be regarded as the same subject position based on a result of comparing positions of face areas regarding the same subject between two consecutive frames, for example.

When the position difference from the previous main subject is within the predetermined distance (YES in S21), the controller 135 calculates a size ratio that indicates a ratio between a size of the selected face area and a size of the main subject information D0, and determines whether the size ratio is within a predetermined range (S22). The predetermined range is defined by an upper limit value larger than "1" and a lower limit value smaller than "1", from the viewpoint of defining a range regarded as a variation in size that presumably shows the same subject between frames, for example.

When the size ratio compared to the previous main subject is within the predetermined range (YES in S22), the controller 135 sets the face area selected in Step S20 as a main subject candidate which is a candidate for the main subject in the current frame (S23). Information indicating the main subject candidate is held in, for example, the buffer memory 125.

On the other hand, when the position difference from the previous main subject is not within the predetermined distance (NO in S21), or when the size ratio compared to the previous main subject is not within the predetermined range (NO in S22), it can be determined that the selected face area is not the same subject as the previous main subject. In such a case, the controller 135 proceeds to Step S24 without setting a main subject candidate in Step S23.

The controller 135 determines whether all face areas in the face tracking information D2 are selected (S24). The controller 135 repeats the processes of Steps S20 to S24 until there is no unselected face area (NO in S24).

When all the face areas are selected (YES in S24), the controller 135 refers to the buffer memory 125 to determine whether there are main subject candidates (S25), for example.

When there are main subject candidates (YES in S25), the controller 135 determines the current main subject from main subject candidates (S26). When there is one main subject candidate, the candidate is determined as the main subject. When there are more than one main subject candidates, the controller 135 determines a candidate whose face area position is closest to a position of the main subject information D0, as the main subject.

On the other hand, when determining that there is no main subject candidate (NO in S25), the controller 135 determines that the main subject is lost (S27). In this case, it is determined that there is no main subject (NO in S4) in Step S4 of the subject tracking processing (FIG. 3), for example.

After determining the main subject (S26) or determining that the main subject is lost (S27), the controller 135 ends determination processing of a main subject in Step S3 of FIG. 3 and proceeds to Step S4, for example.

Meanwhile, in the process of Step S7, the controller 135 selects a head area from the head tracking information D4 after the size correction (S6), instead of selecting the face area from the face tracking information D2 in Step S20, and performs the subsequent processes in the same manner as described above (S21 to S27). In this case, the comparison using the position difference and size ratio compared to the previous main subject (S21 and S22) can be performed with the same predetermined distance and the predetermined range as in the case of the face area as references, by using the corrected head area considering that the face is smaller than the head, for example. After the end of determination processing of a main subject in Step S7, the controller 135 proceeds to Step S8 in FIG. 3.

According to the above main subject determination process, the position and size are compared between the main subject information D0 indicating the main subject in the previous frame and the face area in the face tracking information D2 or the head area in the head tracking information D4 in the current frame (S21 and S22). As a result, it is possible to determine the subject, in the face tracking information D2 or the head tracking information D4, which has the position and size of the face area or the head area similar to those of the main subject information D0, as the main subject in the current frame.

Figure 7A:
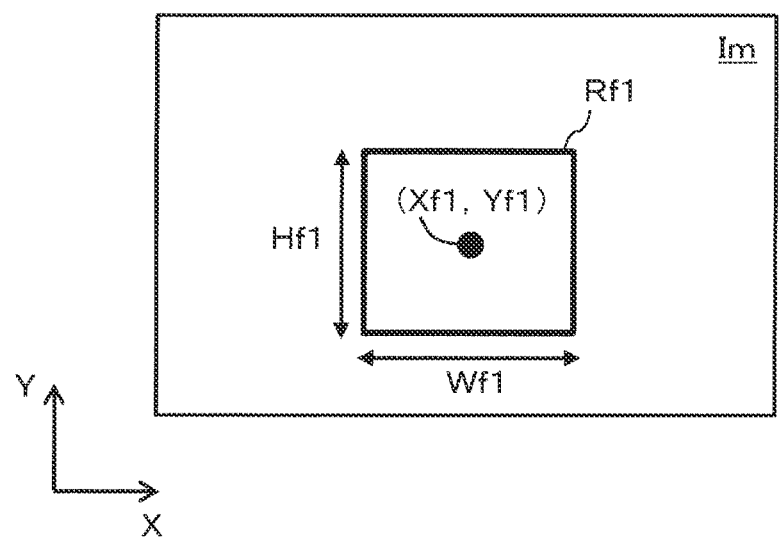
FIGS. 7A and 7B are views for describing determination processing of a main subject in the digital camera.
Figure 7B:
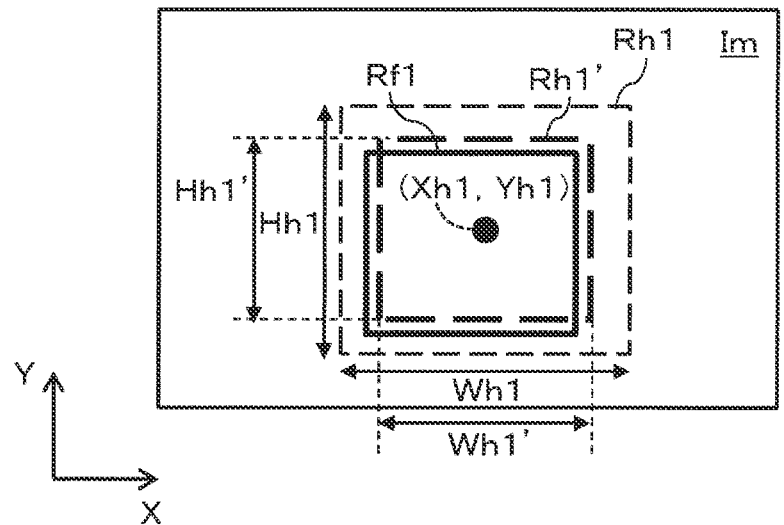

FIGS. 7A and 7B are views for describing determination processing of a main subject in the digital camera 100 of the present embodiment. FIGS. 7A and 7B exemplify the captured image Im in determination process of a main subject (S7) in the case of switching from the tracking result of the face recognizer 122 to the tracking result of the head recognizer 124. FIG. 7A illustrates an example in which the position and size of the face area Rf1 are held as the main subject information D0 in the previous frame at the start of determination process of a main subject. FIG. 7B illustrates an example in which a head area Rh1' in the head tracking information D4 in the current frame is selected (S20) after the example of FIG. 7A. FIG. 7B exemplifies the head areas Rh1 and Rh1' before and after the correction. The corrected head area Rh1' has sizes Wh1' and Hh1' that presumably correspond to a face inside the uncorrected head area Rh.

The example of FIG. 7B illustrates a case where the position (Xf1, Yf1) of the main subject information D0 and the position (Xh1, Yh1) of the selected head area Rh1' are close to each other and a position difference is within the predetermined distance (YES in S21). Further, in the case illustrated, the sizes Wf1 and Hf1 of the main subject information D0 are substantially the same as the sizes Wh1' and Hh1' of the selected head area Rh1' and a size ratio is within the predetermined range (YES in S22). In such a case, an area corresponding to the face of the subject, such as the face area Rf1 and the corrected head area Rh1', has a positional relation that can be substantially included in the head area Rh1 corresponding to the head of the same subject, as illustrated in FIG. 7B.

From such a viewpoint, in the example of FIG. 7B, the head area Rh1' is determined as the main subject regarded as the identical subject with the main subject information D0 which is based on the face area Rf1. This determination is based on the relation in the positions and sizes of the face area Rf1 and the head area Rh1 that are overlapped in the captured image Im, corresponding to the face and head of the subject (S26).

As described above, the digital camera 100 of the present embodiment can update the main subject information (S9) by performing determination process of a main subject based on the position and size of the tracking result for the subjects tracked by the face recognizer 122 and the head recognizer 124. The uncorrected head area Rh1 may be used, instead of the corrected head area Rh1', as a comparison target of the main subject information D0. In this case, the predetermined range used as the reference for the size ratio in Step S22 may be changed according to the ratio of size correction, for example.

1-2-4. Selection Processing of Main Subject

The digital camera 100 of the present embodiment updates the sub-subject information in addition to the main subject information D0 as described above, when the face tracking information D2 or the head tracking information D4 includes a plurality of face areas or head areas in the subject tracking processing. According to this, the digital camera 100 provides a main subject selection function that is receiving a user operation of selecting a face area or a head area corresponding to one subject from the sub-subject information, and switching the main subject a selected subject as a new tracking target in the subject tracking processing.

Selection processing of a main subject in the digital camera 100 of the present embodiment will be described with reference to FIGS. 8 to 9C.

Figure 8:
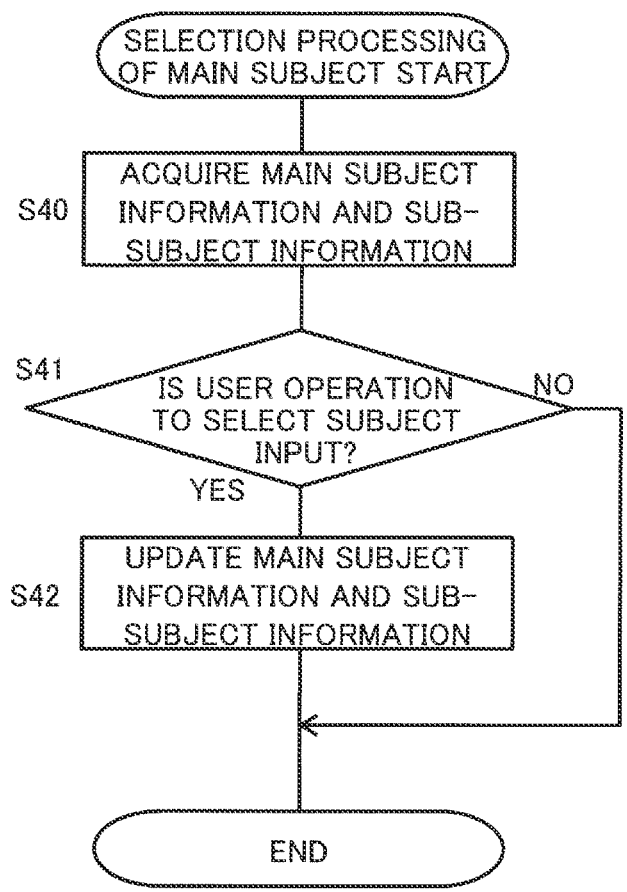
FIG. 8 is a flowchart illustrating selection processing of a main subject in the digital camera.

FIG. 8 is a flowchart illustrating selection processing of a main subject in the digital camera 100 of the present embodiment. The flowchart of FIG. 8 is performed after Step S11 in the subject tracking processing (FIG. 3) performed in a predetermined period, for example. Each processing according to this flowchart is performed by the controller 135 of the digital camera 100, for example.

Figure 9A:
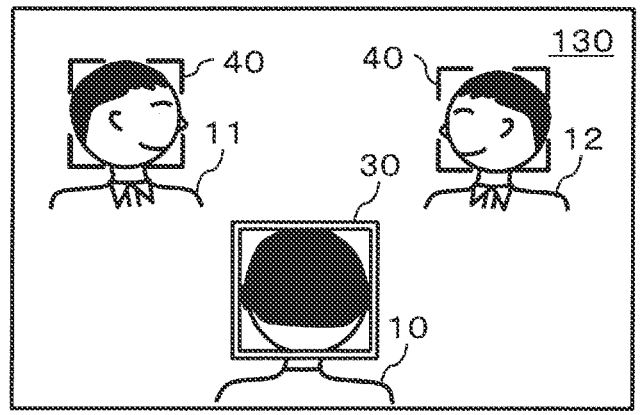
FIGS. 9A to 9C are views for describing selection processing of a main subject in the digital camera.
Figure 9B:
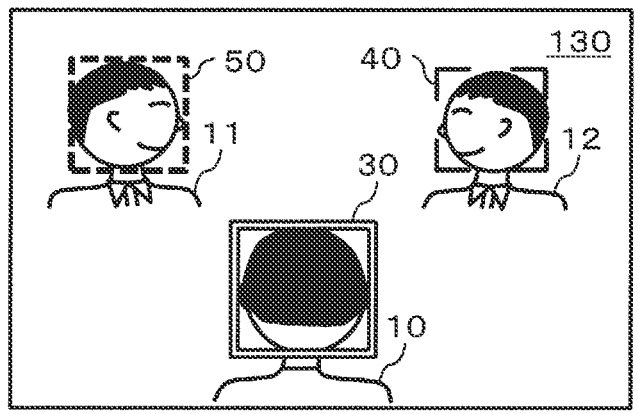
Figure 9C:
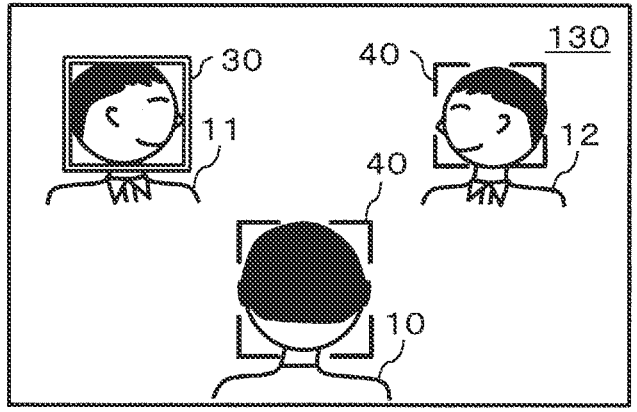

FIGS. 9A to 9C are views for describing the main subject selection processing in the digital camera 100. FIG. 9A illustrates an example displayed in real time on the display monitor 130 of the digital camera 100 when the main subject information D0 and the sub-subject information are updated as illustrated in FIG. 5C. In this display example, the digital camera 100 displays an AF frame 30 indicating a main subject such as an AF target and candidate frames 40 based on the sub-subject information to be superimposed on the captured image Im on the display monitor 130. The digital camera 100 displays the AF frame 30 and the candidate frame 40 in different display modes, so that the main subject being tracked in the subject tracking processing and other recognized subjects are visible to the user.

FIG. 9B illustrates an example in which the user inputs a selection operation of a subject in the display example of FIG. 9A. FIG. 9C illustrates a display example in which the main subject is changed from FIG. 9A in response to the selection operation of FIG. 9B. The selection operation of a subject can be performed by receiving, through the operation member 150, an user operation for selecting one candidate frame 40 from among the candidate frames 40 on a through image displayed on the display monitor 130, for example.

In the flowchart of FIG. 8, the controller 135 first acquires the main subject information D0 and the sub-subject information from the buffer memory 125, for example (S40). In the example of FIG. 9A, the AF frame 30 is displayed to correspond to the person 10 based on the main subject information D0, and the candidate frames 40 are displayed to correspond to a person 11 and a person 12 based on the sub-subject information.

Next, the controller 135 determines whether the selection operation of a subject is input by the user through the operation member 150 (a touch panel, a joystick, or the like) (S41), for example.

When the selection operation of a subject is input by the user (YES in S41), the controller 135 updates the main subject information D0 and the sub-subject information according to the selected candidate frame 40 (S42). Specifically, the controller 135 stores a position and a size of the main subject information D0 in the sub-subject information associated with a face area or a head area corresponding to the AF frame 30. Further, the controller 135 deletes the selected candidate frame 40 in the sub-subject information from the sub-subject information, and updates the main subject information D0 according to a position and a size corresponding to the candidate frame 40.

FIG. 9B illustrates a state where the candidate frame 40 of the person 11 is selected. As illustrated in FIG. 9B, the digital camera 100 displays the selected candidate frame 40 as a selection frame 50 in a display mode different from those of the AF frame 30 and any other candidate frame 40. In the display example of FIG. 9C, the AF frame 30 is displayed to correspond to the person 11 selected as the main subject in response to the selection operation of FIG. 9B, and the candidate frame 40 is displayed to correspond to the person 10.

After updating the main subject information D0 and the sub-subject information (S42) or when determining that no selection operation is input by the user (NO in S41), the controller 135 ends the processing illustrated in this flowchart and repeats Step S1 and the subsequent steps in FIG. 3, for example.

According to the above selection processing of a main subject, the main subject information D0 is updated by receiving the selection operation input by the user, which is resulting from displaying the candidate frame 40 corresponding to the sub-subject based on the sub-subject information held in the subject tracking processing. As a result, the main subject to be tracked in the subject tracking processing can be switched according to the user's intention.

In the digital camera 100 of the present embodiment, the AF frame 30, the candidate frame 40, and the selection frame 50 are displayed without any particular distinction depending on whether a subject is recognized by the face recognizer 122 or the head recognizer 124.

1-2-5. Face Tracking Processing

The digital camera 100 of the present embodiment performs the face tracking processing based on the face detection by the face recognizer 122. The face tracking processing will be described with reference to FIGS. 10 to 12.

Figure 10:
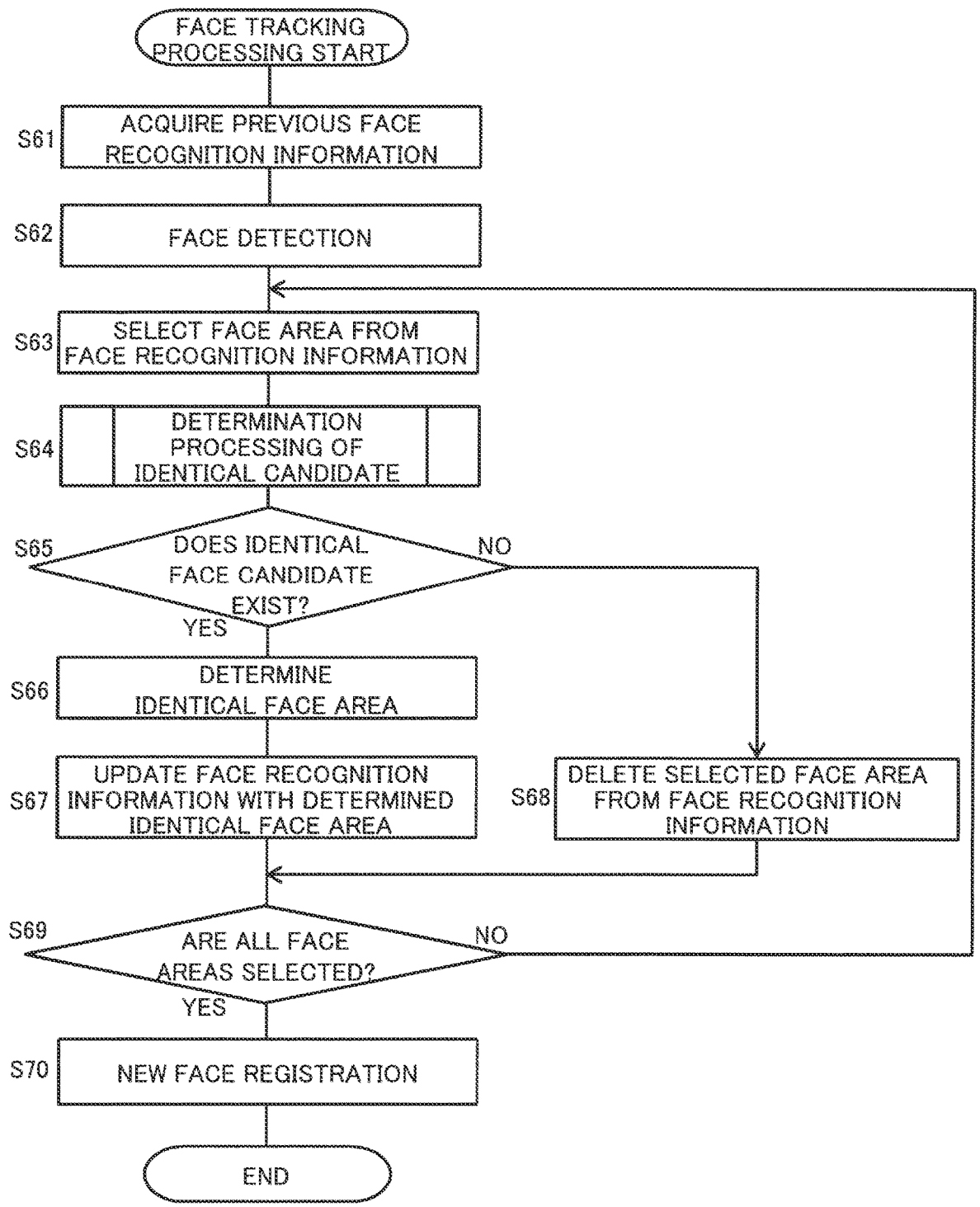
FIG. 10 is a flowchart illustrating face tracking processing in the digital camera.

FIG. 10 is a flowchart illustrating the face tracking processing in the digital camera 100 of the present embodiment. The processing illustrated in the flowchart of FIG. 10 is repeatedly performed with the same period as that of the subject tracking processing (FIG. 3), for example. Each process of this flowchart is performed by the face recognizer 122, for example.

Figure 11:
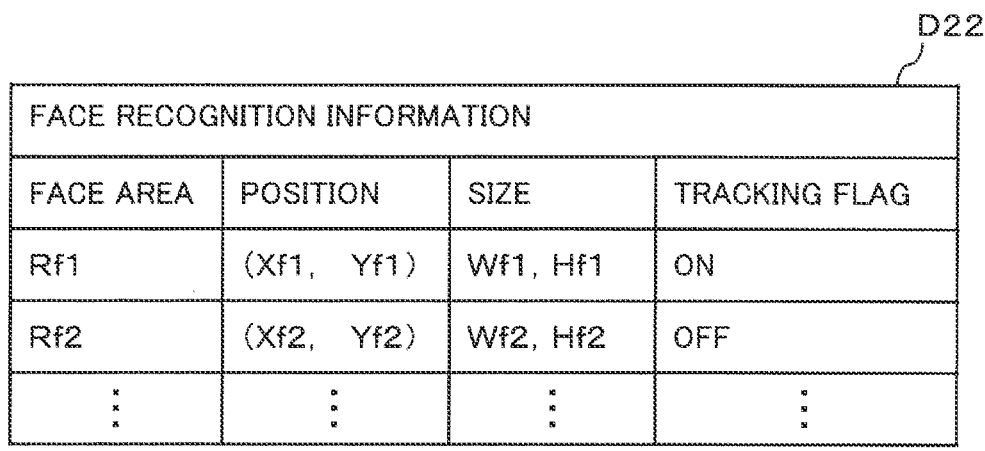
FIG. 11 is a view illustrating face recognition information in the digital camera.

FIG. 11 illustrates face recognition information D22 in the digital camera 100 of the present embodiment. The face recognition information D22 is information to manage a recognition result of the face recognizer 122, and is sequentially updated in the face tracking processing. The face recognition information D22 includes a "tracking flag" to manage a tracking state by the face recognizer 122, in addition to a position and a size of a face area similar to those in the face tracking information D2, for example. For example, information on the face area whose tracking flag is "on" in the face recognition information D22 constitutes the face tracking information D2, and is used for the subject tracking processing described above. The face recognition information D22 is stored in the buffer memory 125, for example.

In the flowchart of FIG. 10, the face recognizer 122 first acquires the face recognition information D22 which is updated in previous face tracking processing performed on a previous frame as a processing target (S61) from the buffer memory 125, for example.

Next, the face recognizer 122 performs an image recognition processing for face detection in a current frame (S62). The face recognizer 122 generates, as a detection result of the face detection, information including a position and a size associated with each face area as in the face tracking information D2 for each recognized face area, for example.

The face recognizer 122 selects one face area from the previous face recognition information D22 (S63).

The face recognizer 122 performs determination processing of an identical candidate (S64) on the selected face area. In determination process of an identical candidate, a face area selected from the previous face recognition information D22 and each face area in the detection result of the current face detection are compared to set the face area in the detection result as an identical face candidate. The identical face candidate is a face area, in the current detection result, which is a candidate for an identical subject with the face area selected from the face recognition information D22. When the current detection result includes a plurality of face areas, the identical face candidate may include a plurality of face areas. Details of determination processing of the identical candidate (S64) will be described later.

The face recognizer 122 determines whether an identical face candidate exists (S65) based on a result of determination processing of the identical candidate (S64).

When there is the identical face candidate (YES in S65), the face recognizer 122 determines an identical face area indicating a face area which is closest to the face area selected from the face recognition information D22, in the identical face candidate (S66).

Next, the face recognizer 122 updates a position and a size of the face area selected in the face recognition information D22, with a position and a size of the determined identical face area (S67).

On the other hand, when there is no identical face candidate in the detection result (NO in S65), the face recognizer 122 recognizes that face tracking is lost with respect to the selected face area, and deletes the selected face area from the face recognition information D22 (S68), for example.

The face recognizer 122 determines whether all face areas in the face recognition information D22 are selected (S69). The face recognizer 122 repeats the processes of Steps S63 to S69 until all the face areas are selected (NO in S69).

After selecting all the face areas of the face recognition information D22 (YES in S69), the face recognizer 122 performs new face registration (S70). The new face registration (S70) is processing to add a face area in the detection result to the face recognition information D22 as a candidate for a tracking target, when the face area is not determined to be the identical face area with any face area in the face recognition information D22. In the new face registration, the face recognizer 122 adds the face area to the face recognition information D22 with a tracking flag set to "off", for example.

After performing the new face registration (S70), the face recognizer 122 ends the current face tracking processing. Thereafter, the face recognizer 122 executes the next face tracking processing based on the updated face recognition information D22.

The face recognizer 122 of the present embodiment sets a face area continuously detected twice or more as the tracking target, for example. When the face area added to the face recognition information D22 in Step S70 and a face area detected in the next face tracking processing are determined to be the identical face area, the face recognizer 122 turns on the tracking flag of the face area in the face recognition information D22. In this way, the face recognizer 122 to set the face area as a tracking target in the subsequent face tracking processing. As a result, the face recognizer 122 can set, as the tracking target, a newly detected subject which does not exist in past tracking results.

According to the above face tracking processing, based on the result of the face detection (S62), the face recognizer 122 determines the identity of the face area with the past face recognition information D22 (S64), and updates the face recognition information D22 (S67) to continue tracking the face area. As a result, the controller 135 can use the face area whose tracking flag is turned on in the face recognition information D22 as the face tracking information D2 in the subject tracking processing (FIG. 3) and the main subject selection process (FIG. 8), for example.

1-2-5-1. Determination Processing of Identical Candidate

Details of the determination processing of the identical candidate (S64) will be described with reference to FIG. 12.

Figure 12:
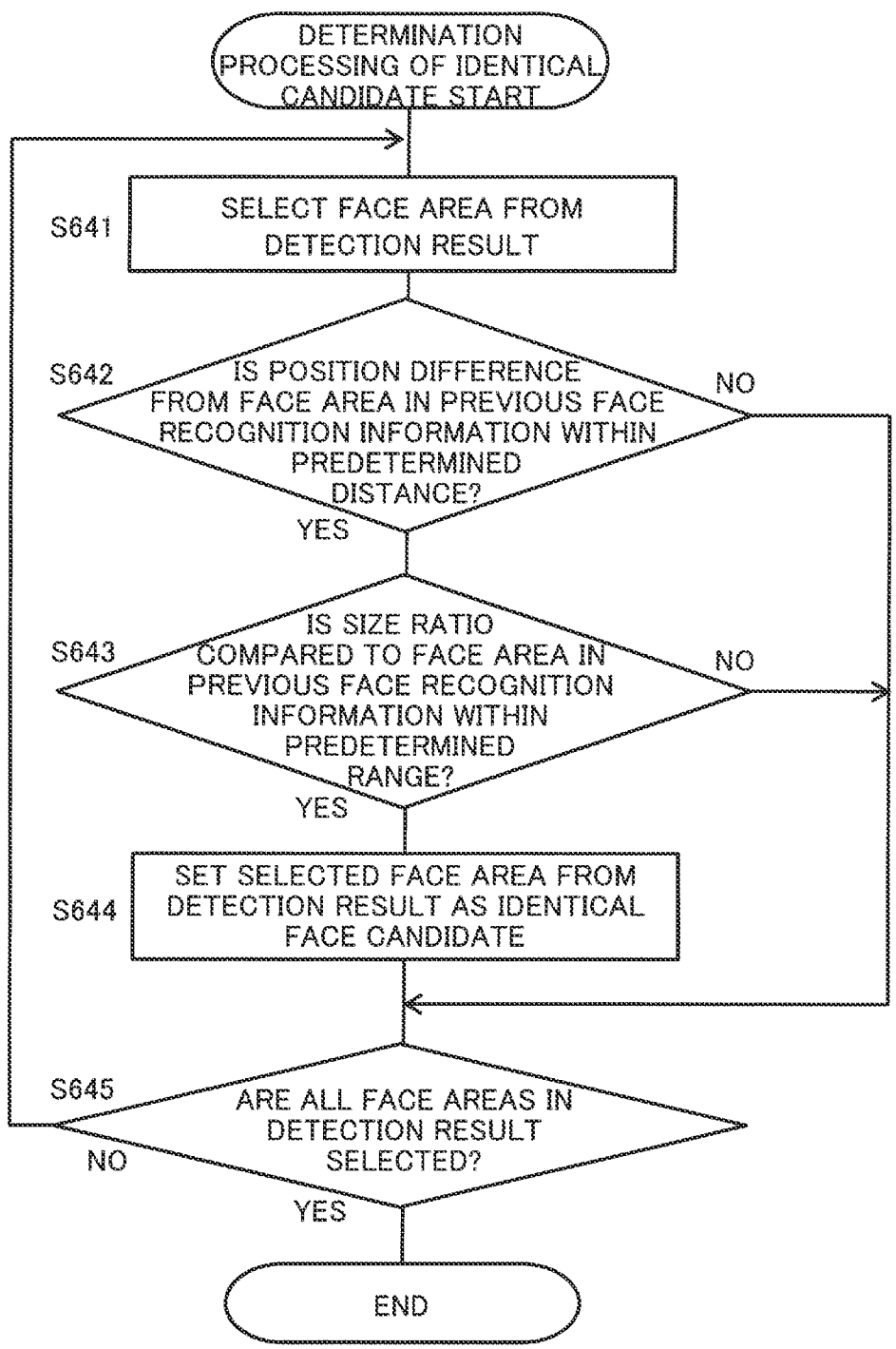
FIG. 12 is a flowchart illustrating determination processing of an identical candidate in the digital camera.

FIG. 12 is a flowchart illustrating determination processing of the identical candidate (S64) in the digital camera 100 of the present embodiment. This flowchart is started after the face area is selected from the previous face recognition information D22 (S63) in the state of holding the detection result of the face detection (S62) in the face tracking processing. Hereinafter, a description will be given regarding an example in which the face area Rf1 is selected in the face recognition information D22 illustrated in FIG. 11.

First, the face recognizer 122 selects one face area from the detection result (S62) of the current face detection (S641).

Next, the face recognizer 122 determines whether a position difference between the face area selected from the current detection result and the face area Rf1 in the previous face recognition information D22 is within a predetermined distance (S642). The predetermined distance is set in the same manner as in Step S21 in determination process of a main subject (S3, S7), for example.

When the position difference from the previous face area Rf1 is within the predetermined distance (YES in S642), the face recognizer 122 determines whether a size ratio between the selected face area and the previous face area Rf1 is within a predetermined range (S643). The predetermined range is set in the same manner as in Step S22 in determination process of a main subject (S3, S7), for example.

When the size ratio from the previous face area Rf1 is within the predetermined range (YES in S643), the face recognizer 122 sets the selected face area as an identical face candidate (S644).

On the other hand, when the position difference from the previous face area Rf1 is larger than the predetermined distance (NO in S642) or when the size ratio does not is within the predetermined range (NO in S643), the face recognizer 122 proceeds to Step S655.

The face recognizer 122 determines whether all face areas in the current detection result are selected (S645). The face recognizer 122 repeats the processes of Steps S641 to S645 until there is no unselected face area (NO in S645).

After all the face areas in the detection result are selected (YES in S645), the face recognizer 122 ends determination processing of the identical candidate (S64), and proceeds to Step S65 of the face tracking processing (FIG. 10).

According to the above determination processing of the identical candidate (S64), the identical face candidate is determined by comparing the face area in the detection result by the face recognizer 122 and the face area selected from the face recognition information D22. As a result, a face area that can be considered with the identical subject as the face area tracked in the face tracking processing can be determined from the identical face candidate (S66).

1-2-6. Head Tracking Processing

The digital camera 100 of the present embodiment performs the head tracking processing so as to update head recognition information, as replacement for the face recognition information D22, similarly to the face tracking processing based on the head detection by head recognizer 124 instead of the face detection by face recognizer 122. Hereinafter, the head tracking processing will be described with reference to FIGS. 13 and 14 while omitting the same description as that of the face tracking processing as appropriate.

Figure 13:
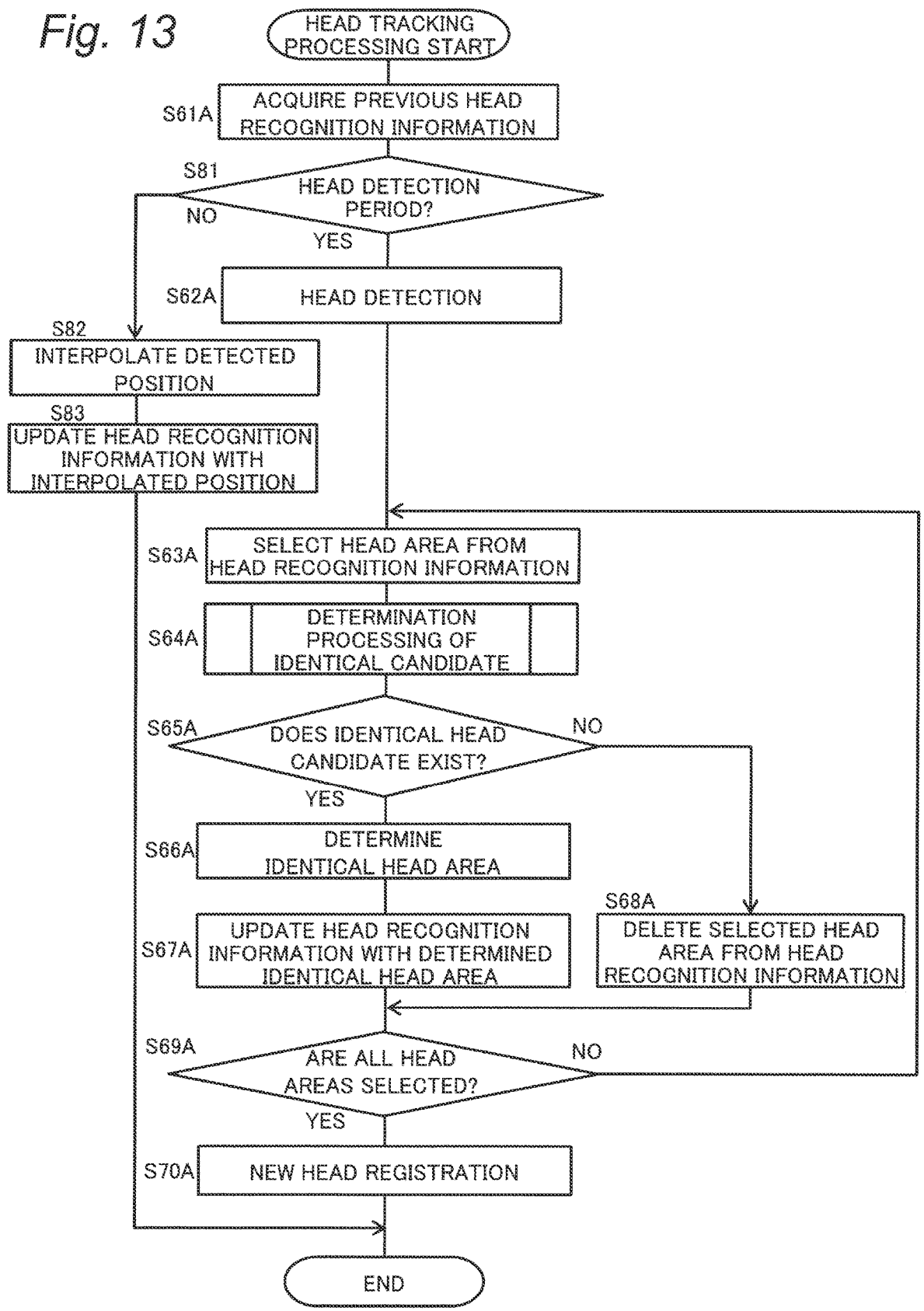
FIG. 13 is a flowchart illustrating head tracking processing in the digital camera.

FIG. 13 is a flowchart illustrating the head tracking processing in the digital camera 100 of the present embodiment. The flowchart of FIG. 13 is repeatedly performed with the same period in parallel with the subject tracking processing (FIG. 3), which is similar to the face tracking processing, for example. Each process of this flowchart is performed by the head recognizer 124, for example.

Figure 14:
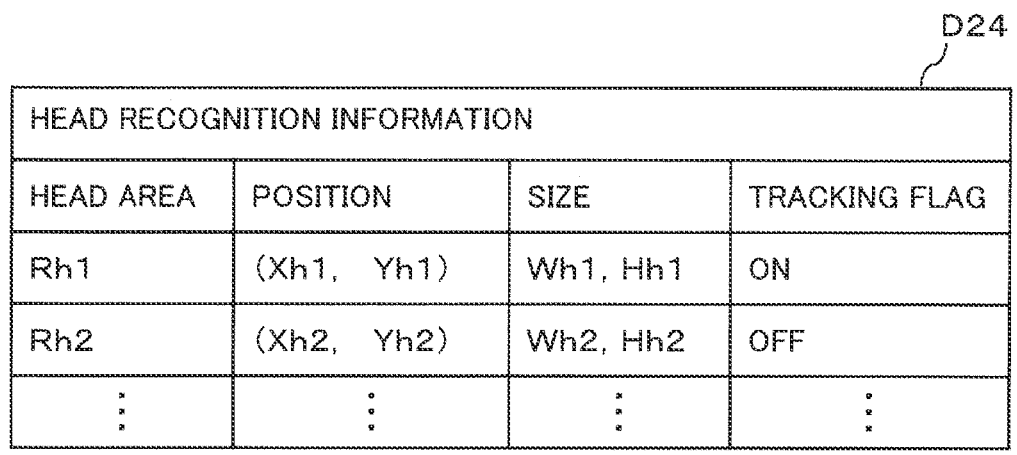
FIG. 14 is a view illustrating head recognition information in the digital camera.

FIG. 14 is a view illustrating head recognition information D24 in the digital camera 100 of the present embodiment. The head recognition information D24 is information to manage a recognition result of the head recognizer 124, and includes a position, a size, and a tracking flag regarding a head area in a result of the head detection, similarly to the face recognition information D22. The information on the head area with the tracking flag set to "on" in the head recognition information D24 constitutes the head tracking information D4.

In the head tracking processing illustrated in FIG. 13, the head recognizer 124 executes an image recognition processing for head detection (S62A), instead of the face detection (S62), in a period set to be longer than a face detection period (S81) in a similar processing to the processing illustrated in the flowchart of FIG. 10. The head recognizer 124 acquires the head recognition information D24 updated in the previous head tracking processing (S61A), and performs similar processes to those in Steps S63 to S70 based on a detection result of the head detection (S62A) every period when head detection is being executed (YES in S81).

The head recognizer 124 performs the head detection (S62A) using a learned model that outputs a detection result at the head detection period. Setting an execution period of the learned model of the head recognizer 124 is set to be longer than that of the face detection, it is possible to mitigate the influence of a processing load heavier than that of the face recognizer 122, for example.

On the other hand, when head detection is not being executed (NO in S81), the head recognizer 124 interpolates a position of a head area by the motion detector based on a position detected in the previous head detection by the learned model (S82), for example.

The head recognizer 124 interpolates a detection result of the learned model (S82), and updates the position of the head area in the head recognition information D24 based on the interpolated position (S83). Thereafter, the head recognizer 124 ends the processing of this flowchart.

When the head detection is being executed (YES in S81), the head recognizer 124 selects a head area of the previous head recognition information D24 (S63A), and performs determination processing of the identical candidate (S64A) with a head area in a detection result of the current head detection (S62A). In the identical candidate determination in Step S64A, an identical head candidate is determined in the head area of the detection result of the head detection, instead of the face detection result and face recognition information D22 in S64 in FIG. 10. The identical head candidate is a candidate for an identical subject with the head area selected from the head recognition information D24.

When there is an identical head candidate (YES in S65A), the head recognizer 124 determines an identical head area from the identical head candidate (S66A). The head recognizer 124 updates the head recognition information D24 according to a position and a size of the determined identical head area (S67A). On the other hand, when there is no identical head candidate (NO in S65A), the head recognition information D24 deletes the selected head area from the head recognition information D24 (S68A).

The head recognizer 124 repeats the processes of Steps S63A to S69A until all head areas in the head recognition information D24 are selected (NO in S69). When all the head areas are selected from the head recognition information D24 (YES in S69A), the head recognizer 124 performs new head registration (S70A) to add, to the head recognition information D24, a head area that is a candidate for a tracking target, instead of the face area and face recognition information D22 in the new face registration (S70).

According to the above head tracking processing, the head recognizer 124 continues tracking the head area by updating the head recognition information D24 (S67A and S83) based on the result of the head detection (S62A).

1-3. Effects and the Like

As described above, the digital camera 100 of the first embodiment is an example of the image tracking apparatus that tracks a subject in a moving image in which the subject is captured. The digital camera 100 includes the image sensor 115 (image acquisition device), the face recognizer 122 (first detector), the head recognizer 124 (second detector), and the controller 135 (controller). The image sensor 115 acquires image data indicating the moving image. The face recognizer 122 detects a face area (first area) corresponding to a face of at least one subject in acquired image data to track the face area in the moving image (S61 to S70). The head recognizer 124 detects a head area (second area) corresponding to a head including a face of at least one subject in the image data to track the head area in the moving image (S61A to S70A). The controller 135 tracks the subject by switching between a tracking result of the face area by the face recognizer 122 and a tracking result of the head area by the head recognizer 124 (S1 to S11). The face recognizer 122 and the head recognizer 124 operate independently of each other.

According to the above digital camera 100, the subject is continuously identified by selectively using the tracking results of the face recognizer 122 and the head recognizer 124, which track the face area and the head area, respectively. As a result, it is possible to improve the accuracy of tracking the subject in the image data.

In the present embodiment, the controller 135 tracks the subject using the tracking result of the face recognizer 122 when the face area is tracked by the face recognizer 122. The controller 135 switches from the tracking result of the face recognizer 122 to the tracking result of the head recognizer 124 when the face area is not tracked by the face recognizer 122 and the head area is tracked by the head recognizer 124 (S1 to S9). As a result, even in the case where the subject is shown in the moving image but the face is not shown due to the change of the face orientation or posture of the subject or the like, the subject can be continuously tracked by using the tracking result of the head recognizer 124.

In the present embodiment, in response to loss of the face area by the face recognizer 122, the controller 135 determines whether the face area and the head area indicate the identical subject based on the positional relation between the face area and the head area (S7). Upon determining that the first and second areas indicate the identical subject (YES in S8) the controller 135 switches from the tracking result of the face recognizer 122 to the tracking result of the head recognizer 124. As a result, the identical subject can be tracked by using the tracking results of the face recognizer 122 and the head recognizer 124 that operate independently of each other.

In the present embodiment, after switching to the tracking result of the head recognizer 124, the controller 135 switches from the tracking result of the head recognizer 124 to the tracking result of the face recognizer 122 upon tracking the face area by the face recognizer 122 (S1 to S4 and S9). As a result, it is possible to track the subject preferentially using the tracking result of the face recognizer 122.

In the present embodiment, upon switching from the tracking result of the face recognizer 122 to the tracking result of the head recognizer 124, the controller 135 tracks the subject by using the tracking result of the according to positional relation that the face area is included in the head area (S7). In addition, upon switching from the tracking result of the head recognizer 124 to the tracking result of the face recognizer 122, the controller 135 tracks the subject by using the tracking result of the face recognizer 122 according to positional relation that the face area is included in the head area (S3). In this processing, the controller 135 determines whether the face area is included in the head area based on the position and size of the face area and the position and size of the head area. As a result, it is possible to determine the identity of the subject before and after the switching based on the positional relation between the face area and the head area, reflecting that the face area and the head area respectively correspond to the face and the head including the face of the subject.

In the present embodiment, the face recognizer 122 tracks each of face areas of a plurality of subjects, and/or the head recognizer 124 tracks each of head areas of a plurality of subjects. The controller 135 tracks the main subject and another subject in the plurality of subjects respectively, based on the tracking result of the face recognizer 122 and the tracking result of the head recognizer 124 (S9 and S11). As a result, the main subject can be changed to another subject in response to the user operation for selecting the subject from the plurality of subjects (S40 to S42).

In the present embodiment, the period with which the face recognizer 122 detects the face area is shorter than the period with which the head recognizer 124 detects the head area. As a result, the subject can be tracked with high accuracy by preferentially using the tracking result of the face recognizer 122 while mitigating the influence of the processing load of the head recognizer 124, which is heavier than that of the face recognizer 122, for example.

In the present embodiment, the head recognizer 124 interpolates the detection result of the head area according to a motion of the subject in the moving image to track the head area (S81 to S83). As a result, it is possible to improve the accuracy in tracking the subject using the tracking result of the head area based on the interpolated detection result.

In the present embodiment, the head recognizer 124 detects the head area using the learned model. The learned model is obtained by machine learning, based on the image data obtained by capturing image showing the head of the subject including at least one of a human and a non-human animal. As a result, the head area can be detected regardless of the face orientation or posture of the subject by using the learned model which is trained on image data showing face orientations in all directions including the profile and back of the head, for example.

In the present embodiment, the image sensor 115 (image acquisition device) is an example of the imager that captures the subject to generate the image data. The digital camera 100 of the present embodiment constitutes an imaging apparatus that tracks a subject in real time in the image data captured by the image sensor 115 as the image tracking apparatus. The image acquisition device is not limited to the image sensor 115, and may be configured as an interface circuit that receives image data.

The digital camera 100 of the present embodiment further includes the operation member 150 (operation interface). The operation member 150 inputs the user operation to set the main subject. The controller 135 manages the main subject information D0, to track the main subject in the moving image (S1 to S11). The information D0 is the information to identify the main subject in the image data, based on the tracking results of the face recognizer 122 and the head recognizer 124. In response to input of the user operation to change the main subject (YES in S41) in the state where the plurality of areas corresponding to the plurality of subjects are tracked by the face recognizer 122 and the head recognizer 124, the controller 135 updates the main subject information D0 to replace information to identify the main subject before changed with information to identify the main subject after changed (S42). During this processing, the controller 135 updates the main subject information D0 based on the tracking results which are output by the face recognizer 122 or the head recognizer 124 when the user operation is input.

According to the above digital camera 100, the main subject is tracked by managing the main subject information D0 regardless of which of the tracking results of the face recognizer 122 and the head recognizer 124 is used (S1 to S11). In a case where selection operation of a subject is input by the user when there are the plurality of subjects (YES in S41), by changing the main subject information D0 in response to the user operation (S42), the main subject after changed can be tracked accordingly. In this manner, it is possible to easily switch the main subject to be tracked in response to the user operation, resulting in improving the accuracy in tracking a subject according to the user's intention.

In the present embodiment, the tracking result of the face recognizer 122 includes the position and size of the face area in the image data, and the tracking result of the head recognizer 124 includes the position and size of the head area in the image data. As a result, it is possible to manage the main subject information D0 indicating the position and size of the main subject regardless of which of the tracking results of the face recognizer 122 and the head recognizer 124 is used (S1 to S11).

Second Embodiment

The digital camera 100 using the tracking results of the face recognizer 122 and the head recognizer 124, which are examples of the first detector and the second detector, is described in the first embodiment. In the second embodiment, the digital camera 100 further using a tracking result of a third detector will be described.

Hereinafter, the digital camera 100 according to the present embodiment will be described by omitting the description of the configurations and operations similar to those of the digital camera 100 according to the first embodiment as appropriate.

2-1. Configuration

The image processing engine 120 of the present embodiment functions as a human body recognizer that realizes a detection function and a tracking function of a human body area corresponding to a body of a subject by image recognition of a captured image, in addition to functioning as the face recognizer 122 and the head recognizer 124 similar to those of the first embodiment. The image processing engine 120 as the human body recognizer is an example of the third detector in the present embodiment. The human body recognizer can be obtained as a learned model based on training data using an image of the human body instead of a head in supervised learning similar to, for example, the head recognizer 124.

In the digital camera 100 of the present embodiment, the face recognizer 122, the head recognizer 124, and the human body recognizer operate in parallel to respectively perform face tracking processing, head tracking processing, and human body tracking processing in different execution periods.

2-2. Operation

An operation of the digital camera 100 in the present embodiment will be described with reference to FIG. 15.

Figure 15:
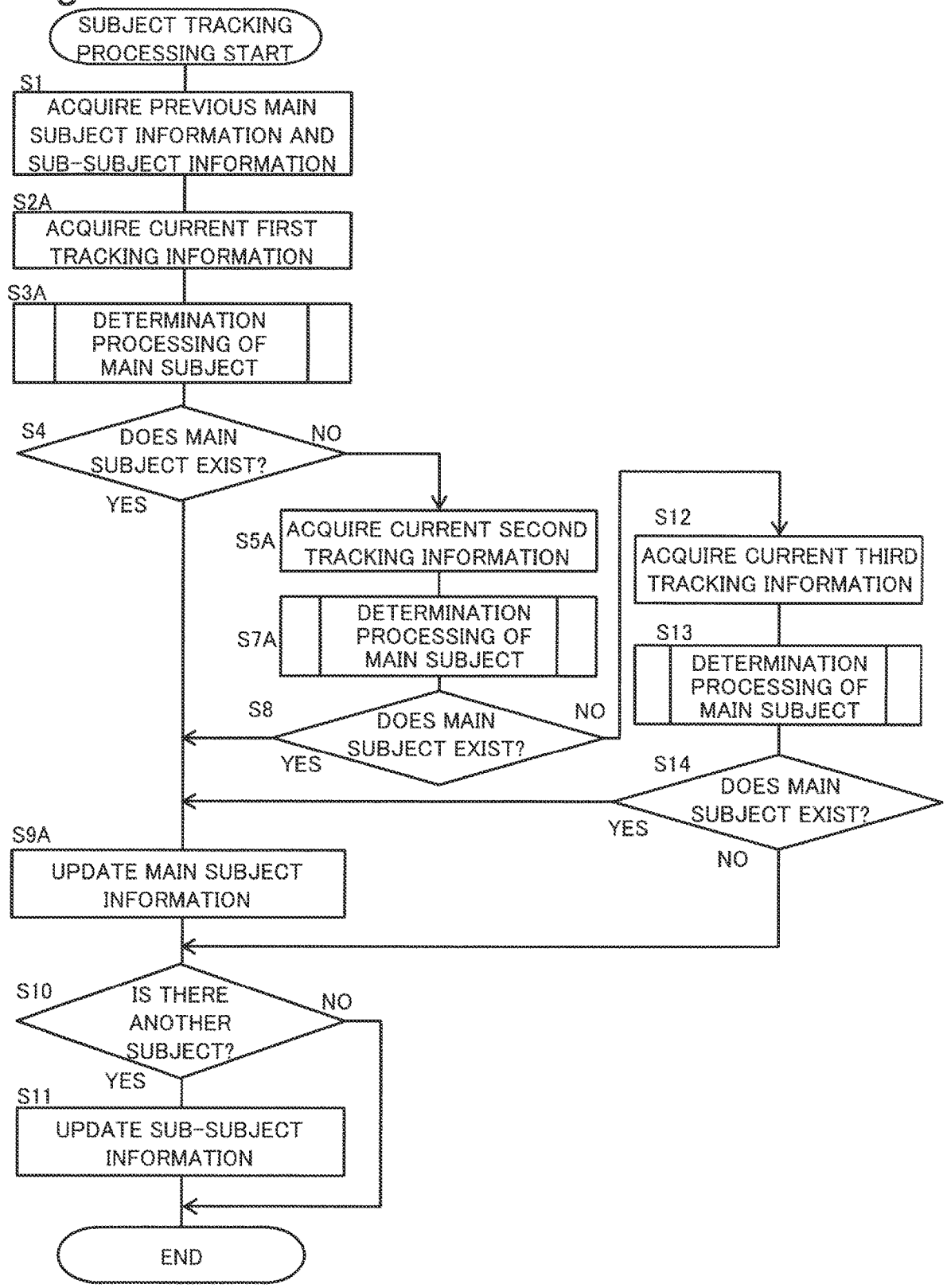
FIG. 15 is a flowchart illustrating subject tracking processing in a digital camera according to a second embodiment.

FIG. 15 is a flowchart illustrating subject tracking processing in the digital camera 100 of the present embodiment. The subject tracking processing illustrated in this flowchart is repeatedly performed by the controller 135 of the digital camera 100 in the same period as that in the first embodiment, for example.

In the subject tracking processing of the first embodiment, the face recognizer 122 is used to track the subject with priority over the head recognizer 124 (FIG. 3). In the subject tracking processing of the present embodiment, for example, the priority order of three detectors in ascending order of execution period is used. For example, the priority order in the example in FIG. 15 is set such that the face recognizer 122 is the first, the head recognizer 124 is the next, and the human body recognizer is the last.

In the first embodiment, the size of the head area is corrected for comparison with the face area (S6) before determination process of a main subject (S7 in FIG. 3). In the present embodiment, correction to make tracking results of the respective detectors comparable with each other is performed in a main subject determination process (S3A, S7A, and S13). Details of determination process of a main subject (S3A, S7A, and S13) in the present embodiment will be described later.

Further, the digital camera 100 of the present embodiment updates the main subject information D0 to include detector information that indicates which of the detectors has a main subject in its tracking result, every time the subject tracking processing is performed (S9A). The detector information is used to correct the tracking result of each of the detectors in determination process of a main subject (S3A, S7A, and S13).

The processes of Steps S1, S4, S8, and S10 to S11 in FIG. 15 are the same as those in the first embodiment (FIG. 3), and the description thereof will be omitted below. In the digital camera 100 of the present embodiment, the controller 135 acquires the face tracking information D2 from the face recognizer 122 in the same manner as in Step S2 of FIG. 3 (S2A). The face tracking information D2 is an example of first tracking information indicating a tracking result of the first detector. A face area tracked by the face recognizer 122 is an example of a first area in the present embodiment.

Next, the controller 135 determines a main subject based on the face tracking information D2 (S3A). In the present embodiment, when determining that the main subject exists in the face tracking information D2 (YES in S4), the controller 135 updates the main subject information D0 so that the detector information indicates the face recognizer 122 in a process similar to Step S9 in FIG. 3 (S9A).

On the other hand, when determining that the main subject does not exist in the face tracking information D2 (NO in S4), the controller 135 acquires the head tracking information D4 from the head recognizer 124 in the same manner as in Step S5 of FIG. 3 (S5A). The head tracking information D4 is an example of second tracking information indicating a tracking result of the second detector.

The controller 135 uses the head tracking information D4, instead of the face tracking information D2 in Step S3A, to determine the main subject (S7A). When determining that the main subject exists in the head tracking information D4 (YES in S8), the controller 135 updates the main subject information D0 so that the detector information indicates the head recognizer 124 (S9A). At this process, the main subject information D0 of the present embodiment is updated based on a position and an uncorrected size of a head area in the head tracking information D4, which is different from the first embodiment.

On the other hand, when determining that the main subject does not exist in the head tracking information D4 (NO in S8), the controller 135 acquires human body tracking information indicating a tracking result of a human body area from the human body recognizer (S12). The human body tracking information is an example of third tracking information indicating a tracking result of the third detector. For example, the human body tracking information includes a position and a size of the human body area in association with each other, as in the face tracking information D2 and the head tracking information D4 respectively illustrated in FIGS. 4 (B) and 4 (C).

The controller 135 uses the human body tracking information, instead of the face tracking information D2 in Step S3A, to determine the main subject (S13). When determining that there is the main subject (YES in S8), the controller 135 updates the main subject information D0 based on the position and size of the human body area in the human body tracking information so that the detector information indicates the human body recognizer (9A). On the other hand, when determining that there is no main subject (NO in S14), the controller 135 performs processes of Step S10 and the subsequent steps.

According to the above subject tracking processing, the digital camera 100 first determines the main subject using the face tracking information D2 as the tracking result of the first detector (S3A). When the main subject does not exist in the processing result of Step S3A (NO in S4), determination process of a main subject (S7A) is performed using the head tracking information D4 as the tracking result of the second detector. Further, when the main subject does not exist in the processing result of Step S7A (NO in S8), determination process of a main subject (S13) is performed using the human body tracking information as the tracking result of the third detector. In this manner, it is possible to continue tracking the main subject with high accuracy by preferentially using the tracking results of the first to third detectors in ascending order of execution period.

2-2-1. Determination Processing of Main Subject in Second Embodiment

Details of determination process of a main subject in the present embodiment will be described with reference to FIG. 16.

Figure 16:
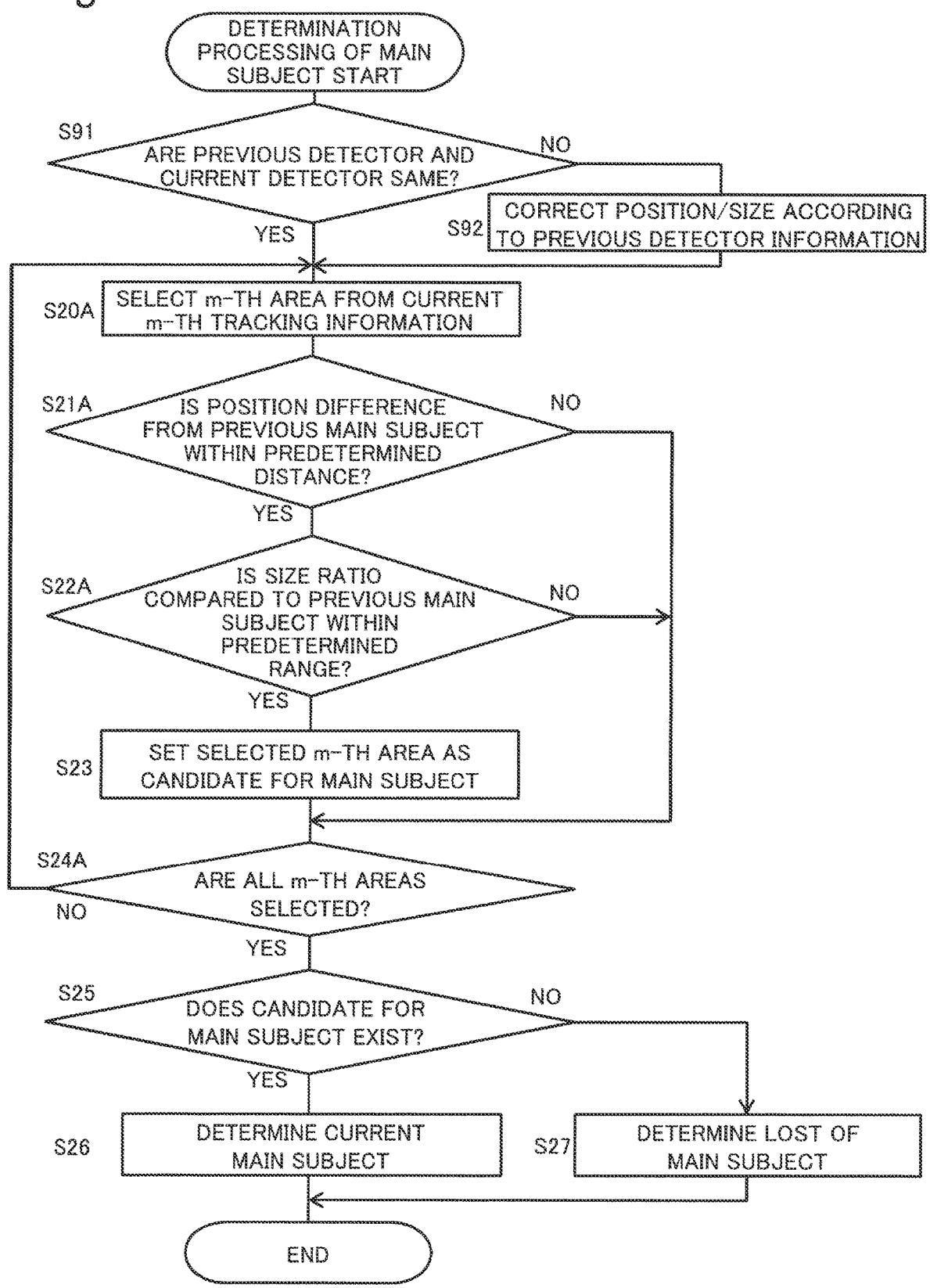
FIG. 16 is a flowchart illustrating determination processing of a main subject in the digital camera according to the second embodiment.

FIG. 16 is a flowchart illustrating determination process of a main subject (S3A, S7A, and S13 in FIG. 15) in the present embodiment. The processes of Steps S23 and S25 to S27 in FIG. 16 are the same as those in the first embodiment (FIG. 6), and the description thereof will be omitted below.

(1) Processing of Step S3A

For example, the processing of Step S3A in FIG. 15 starts in a state where the main subject information D0 of a previous frame and the face tracking information D2 of a current frame are held.

First, the controller 135 determines whether a detector which detected a previous main subject and a detector which generates a tracking result on which determination of a current main subject is performed are the same, based on the detector information in the main subject information D0 (S91). In Step S91 in the processing of Step S3A, it is determined whether the detector of the previous main subject is the face recognizer 122 (first detector).

When the detector of the previous main subject is not the face recognizer 122 (NO in S91), the controller 135 corrects a tracking result other than that of the face recognizer 122 according to the detector information in the main subject information D0, from the viewpoint of comparing the tracking result with the face area (S92). For example, when the previous main subject is tracked by the head recognizer 124, the controller 135 corrects the size of the head area in the head tracking information D4 to be reduced by a predetermined ratio in the same manner as in Step S6 of FIG. 3.

In addition, when the previous main subject is tracked by the human body recognizer, the controller 135 performs correction to compare the human body area and the face area (S92). The human body area is recognized as an area corresponding to the entire human body including the head, and thus, is larger than the head area. Further, for example, when positions of head area and human body area, which are rectangular, are defined as central positions thereof, the position of the human body area is located lower than the position of the head area in the vertical direction in the captured image Im.

Therefore, the controller 135 first corrects the human body area from the viewpoint of comparing with the head area, for example. For example, assuming a human body that is six heads tall, the size of the human body area is reduced to one sixth in the vertical direction on the captured image Im. In the horizontal direction on the captured image Im, the size of the human body area is reduced by a predetermined ratio, for example. For example, the predetermined ratio is a ratio that presumably corresponds to the head part in a width of the body (e.g., 50%). Further, the controller 135 corrects the position of the human body area to be a central position of the uppermost area in areas obtained by dividing a rectangular human body area into sixth in the vertical direction, for example, based on a positional relation in which the head is above the human body.

Next, the controller 135 corrects the size which was corrected as a part corresponding to the head in the human body area, to be reduced to fit the face part similarly to Step S6 of FIG. 3, for example. In the correction described above, the human body may be set to seven heads tall without being limited to the six heads tall, for example. The head-to-body ratio may be determined from an aspect ratio of the size of the human body area or the like.

After correcting a tracking result other than that of the face recognizer 122 (S92) or when the previous main subject is tracked using the tracking result of the face recognizer 122 (YES in S91), the controller 135 proceeds to Step S20A. In Step S20A in the processing of Step S3A, the controller 135 selects one face area (i.e., the first area) from the face tracking information D2 (i.e., the first tracking information) (m=1).

Next, in Steps S21A to S22A, the controller 135 makes a comparison using a position difference and a size ratio compared to the previous main subject in the same manner as in Steps S21 to S22 of FIG. 6. In the processing of Step S3A, the face area or the corrected head area or human body area in the main subject information D0 is compared with the face area in the current face tracking information D2.

After determining the main subject candidate (S23) or when the position difference from the previous main subject does not is within a predetermined distance or the size ratio compared to the previous main subject does not is within a predetermined range (NO for S21A or S22A), the controller 135 proceeds to Step S24A. In the processing of Step S3A, the controller 135 repeats the processes of Steps S20A to S24A until there is no unselected face area in the face tracking information D2 (NO in S24A).

(2) Processing of Step S7A

The processing of Step S7A in FIG. 15 is started in a state where the head tracking information D4 is held, instead of the face tracking information D2 in the processing of Step S3A.

In the processing of Step S7A, the controller 135 first determines whether the detector of the previous main subject is the head recognizer 124 (second detector) based on the detector information in the main subject information D0 (S91).

When the detector of the previous main subject is not the head recognizer 124 (NO in S91), the controller 135 corrects the tracking result other than that of the head recognizer 124, according to the detector information, from the viewpoint of comparing the tracking result with the head area (S92). For example, when the previous main subject is tracked by the face recognizer 122, a size of the face area is corrected to be increased, contrary to the correction similar to Step S6 of FIG. 3, by the predetermined ratio. In addition, when the previous main subject is tracked by the human body recognizer, a size or the like of the human body area in the main subject information D0 is corrected similarly to the correction described in the processing of Step S3A, which is from the viewpoint of comparing the human body area with the head area, for example.

Further, in the processing of Step S7A, the controller 135 sequentially selects one head area (i.e., second area) from the head tracking information D4 (i.e., second tracking information) (S20A), and repeats the processes of Steps S20A to S24A (m=2). In Steps S21A to S22A at this processing, the controller 135 makes a comparison using the position difference and the size ratio is performed by using head tracking information D4, instead of the face tracking information D2 in Steps S21 to S22 of FIG. 6.

(3) Processing of Step S13

The processing of Step S13 in FIG. 15 is started in a state where the human body tracking information is held, instead of the face tracking information D2 in the processing of Step S3A.

In the processing of Step S13, the controller 135 first determines whether the detector of the previous main subject is the human body recognizer (third detector) based on the detector information in the main subject information D0 (S91).

When the detector of the previous main subject is not the human body recognition part (NO in S91), the controller 135 corrects the tracking result other than that of the human body recognizer, from the viewpoint of comparing the tracking result with the human body area according to the detector information (S92). For example, the face area or the head area is corrected in an opposite manner to the case of correcting the human body area in the processes of Steps S3A and S7A described above.

Further, in the processing of Step S13, the controller 135 sequentially selects one human body area (i.e., third area) from the human body tracking information (i.e., third tracking information) (S20A), and repeats the processes of Steps S20A to S24A (m=3). In Steps S21A to S22A at this processing, the controller 135 uses the human body tracking information, instead of the face tracking information D2 in Steps S21 and S22 of FIG. 6.

According to the above main subject determination processing (S3A, S7A, and S13), when the detector in the detector information in the previous main subject information D0 and the detector which generates the tracking result where the current determination processing is performed are different (NO in S91), the size or the like of each tracking result is corrected (S92). As a result, it is possible to determine the presence or absence of the main subject by comparing the tracking results of the detectors that are different between the previous time and the current time.

In Step S92, the example of correcting the size or the like of the tracking result in the previous main subject information D0 is described above. However, without being particularly limited thereto, the current tracking result may be corrected. For example, the previous main subject information D0 or the current tracking result may be corrected from the viewpoint of giving priority to a tracking result of a recognizer having a shorter execution period among the first to third detectors.

2-3. Effects and the Like

As described above, the digital camera 100 of the second embodiment is an example of the image tracking apparatus that tracks a subject in a moving image in which the subject is captured. The digital camera 100 includes the image sensor 115 (image acquisition device), the plurality of detectors, and the controller 135 (control unit). The image sensor 115 acquires image data indicating the moving image. Each of the plurality of detectors detects an area of at least one subject in acquired image data to track the detected area in the moving image. The controller 135 tracks the subject by switching among tracking results of the areas of the subject obtained by the plurality of detectors (S1 to S14). The plurality of detectors include at least the face recognizer 122 (first detector) that detects a face area (first area) as the area of the subject, and the head recognizer 124 (second detector) that detects a head area (second area) as the area of the subject. The execution period of the face recognizer 122 (operation period with which the first detector detects the first area) is shorter than the execution period of the head recognizer 124 (operation period with which the second detector detects the second area). The controller 135 tracks the subject using the tracking result of the face recognizer 122 when the face area is tracked by the face recognizer 122. The controller 135 tracks the subject using the tracking result of the head recognizer 124 when the face area is not tracked by the face recognizer 122 and the head area is tracked by the head recognizer 124. After switching to the tracking result of the head recognizer 124, the controller switches from the tracking result of the head recognizer 124 to the tracking result of the face recognizer 122 upon tracking the face area by the face recognizer 122 (S1 to S9A).

According to the above digital camera 100, the subject can be tracked by preferentially using the tracking result of the face recognizer 122 (first detector) having the shorter execution period than the head recognizer 124 (second detector) among the plurality of detectors. As a result, it is easier to track the subject continuously, so that it is possible to improve the accuracy of tracking the subject in the image data.

In the present embodiment, the plurality of detectors include the human body recognizer (third detector) that detects the human body area (third area), different from the first and second areas, as the area of the subject. The execution period of the human body recognizer (operation period in which the third detector detects the third area) is longer than the execution period of the head recognizer 124. When the head area is not tracked by the head recognizer 124 and the human body area is tracked by the human body recognizer, the controller 135 tracks the subject using the tracking result of the human body recognizer (S1, S5A to S8, S12 to S14, and S9A). As a result, it is possible to continuously track the subject by using the tracking result of the human body recognizer even when the subject is not tracked by the head recognizer 124, preferentially using the tracking result of the head recognizer 124 which has the shorter execution period than the human body recognizer.

The controller 135 switches from the tracking result of the face recognizer 122 to the tracking result of the head recognizer 124 upon loss of the face area by the face recognizer 122 (S1 to S9A). The controller 135 switches from the tracking result of the head recognizer 124 to the tracking result of the human body recognizer upon loss of the head area by the head recognizer 124 (S5A to S8 and S12 to S14). After switching to the tracking result of the human body recognizer, the controller switches from the tracking result of the human body recognizer to the tracking result of the face recognizer 122 upon tracking the face area by the face recognizer 122 (S2A to S4). As a result, it is possible to track the subject according to the priority order, using tracking results in the ascending order of execution period among the three detectors.

The example in which the first detector, the second detector, and the third detector are the face recognizer 122, the head recognizer 124, and the human body detector, respectively, is described in the present embodiment. The first to third detectors are not limited to these, and may detect an area corresponding to a part other than the human face, head, and body on the captured image Im, for example. In addition, the digital camera 100 may perform subject tracking processing using tracking results of four or more detectors whose execution periods are different from each other.

Even in this case, a tracking result of a detector having a shorter execution period is preferentially used in the subject tracking processing. When a subject is not tracked by such the detector, a tracking result of a detector having the next shortest execution period can be used. Thereafter, when the subject is tracked again by the detector having the shorter execution period, the subject tracking can be switched to use the tracking result of that detector. Accordingly, the subject can be tracked with high accuracy.

Third Embodiment

The digital camera 100 in which the execution period differs between the face recognizer 122 and the head recognizer 124 is described in the first embodiment. In a third embodiment, the digital camera 100 in which the recognizers 122 and 124 operate in the same execution period will be described.

Hereinafter, the digital camera 100 according to the present embodiment will be described by omitting the description of the configurations and operations similar to those the digital camera 100 according to the first embodiment as appropriate.

In the image processing engine 120 of the present embodiment, the face recognizer 122 and the head recognizer 124 independently perform face tracking processing and head tracking processing, respectively, similarly to the first embodiment, but operate in the same execution period, which is different from the first embodiment. In the head tracking processing of the present embodiment, it is unnecessary to particularly perform processes related to interpolation of a tracking result (S81 to S83 in FIG. 13). The face recognizer 122 and the head recognizer 124 are examples of a first detector and a second detector in the present embodiment, respectively.

3-1. Overall Operation

Figure 17:
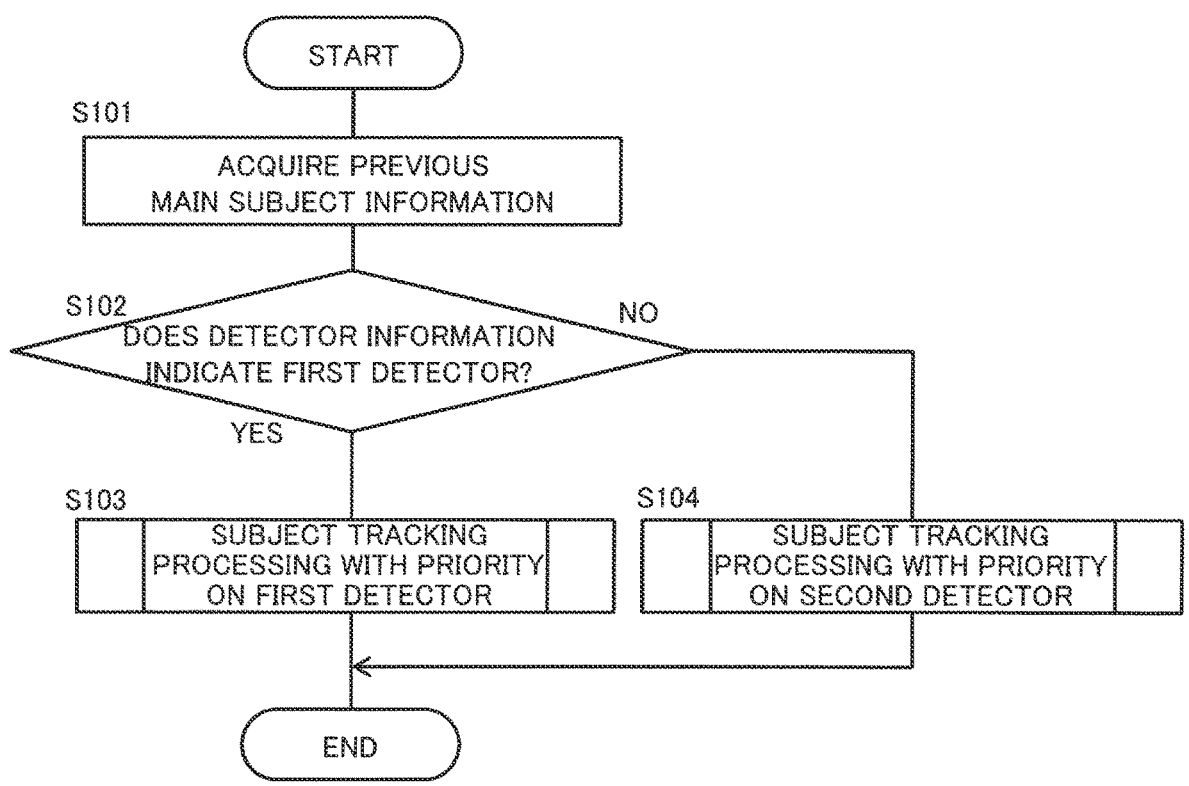
FIG. 17 is a flowchart illustrating an operation of a digital camera according to a third embodiment.

FIG. 17 is a flowchart illustrating an operation of the digital camera 100 according to the present embodiment. In the digital camera 100 of the present embodiment, the controller 135 performs processing of this flowchart, instead of the subject tracking processing of FIG. 3 in the first embodiment.

First, the controller 135 acquires the main subject information D0 regarding a previous frame obtained as a result of previous processing of this flowchart (S101). The main subject information D0 of the present embodiment includes detector information similarly to the second embodiment.

The controller 135 refers to the detector information of the main subject information D0 to determine whether the previous main subject is tracked by the face recognizer 122 (first detector) (S102).

When the previous main subject is tracked by the face recognizer 122 (YES in S102), the controller 135 performs subject tracking processing in which the first detector is prioritized (S103). The subject tracking processing with priority on the first detector (S103) tracks a subject by preferentially using a tracking result of the face recognizer 122.

When the previous main subject has not been tracked by the face recognizer 122 (NO in S102), the controller 135 performs subject tracking processing in which the second detector is prioritized (S104). The subject tracking processing with priority on the second detector (S104) tracks the subject by preferentially using a tracking result of the head recognizer 124 (second detector).

In the subject tracking processing with priority on the first detector (S103) and the subject tracking processing with priority on the second detector (S104), the main subject information D0 including the detector information is updated similarly to Step S9A in FIG. 15.

According to the above processing, the subject tracking processing that preferentially uses the tracking result of the face recognizer 122 is performed (S103) while the main subject is tracked by the face recognizer 122 (YES in S102), by referring to the detector information in the previous main subject information D0. In addition, the subject tracking processing that preferentially uses the tracking result of the head recognizer 124 is performed (S104) while the main subject is tracked by the head recognizer 124 (NO in S102).

In this manner, in the present embodiment, even when the tracking result of the face recognizer 122 is obtained again while the main subject is tracked by the head recognizer 124, the subject tracking processing using the tracking result of the head recognizer 124 (S104) is continued without switching to using the tracking result of the face recognizer 122. As a result, when the subject is tracked by any of the recognizers 122 and 124, it is possible to continue tracking the subject while reducing a processing load by not comparing a face area and a head area, for example.

3-2. Subject Tracking Processing of Third Embodiment

The subject tracking processing with priority on the first detector (S103) and the subject tracking processing with priority on the second detector (S104) in the present embodiment will be described with reference to FIGS. 18 and 19, respectively.

Figure 18:
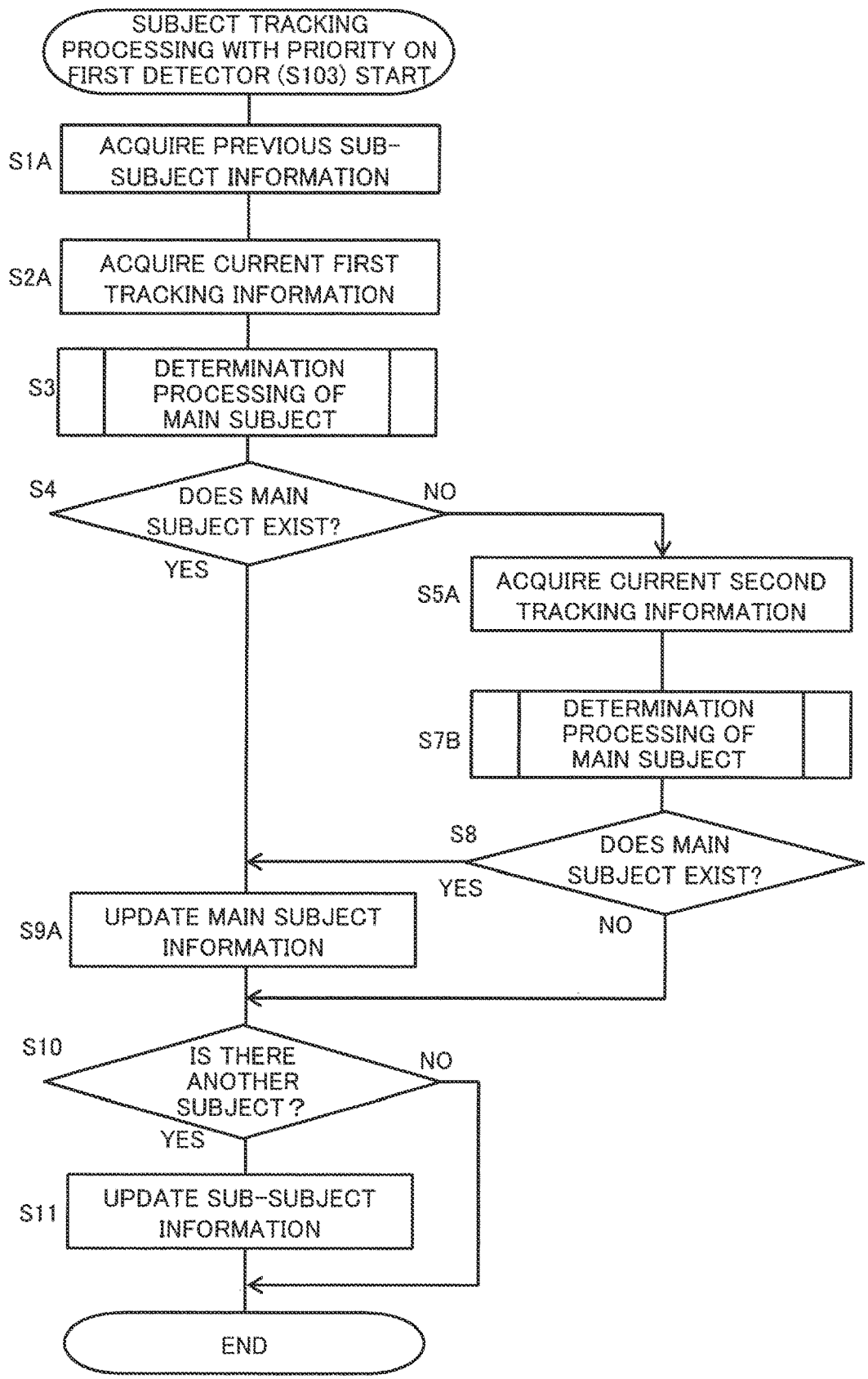
FIG. 18 is a flowchart illustrating subject tracking processing with priority on a first detector in the digital camera according to the third embodiment.

FIG. 18 is a flowchart illustrating the subject tracking processing with priority on the first detector (S103) in the digital camera 100 of the present embodiment. Each process illustrated in the flowchart of FIG. 18 is performed by the controller 135 of the digital camera 100 similarly to the flowchart of FIG. 3 in the first embodiment, for example. Since the processes of Steps S3 to S4, S8, and S10 to S11 in FIG. 18 are the same as those of the first embodiment (FIG. 3) and Steps S2A, S5A, and S9A are the same as those in the second embodiment (FIG. 15), the description thereof will be omitted below.

First, the controller 135 acquires previous sub-subject information (S1A) that is not acquired in Step S101 of FIG. 17, and performs the processes of Steps S2A, S3, and S4.

When there is no main subject in the face tracking information D2 (NO in S4), the controller 135 acquires the head tracking information D4 (second tracking information) (S5A) and determines the main subject (S7B).

In the processing of Step S7B, since the detector information in the previous main subject information D0 indicates the face recognizer 122 (first detector) (YES in S102), the same processes as those of Step S92 and subsequent steps in the processing of Step S3A in FIG. 15 are performed.

Figure 19:
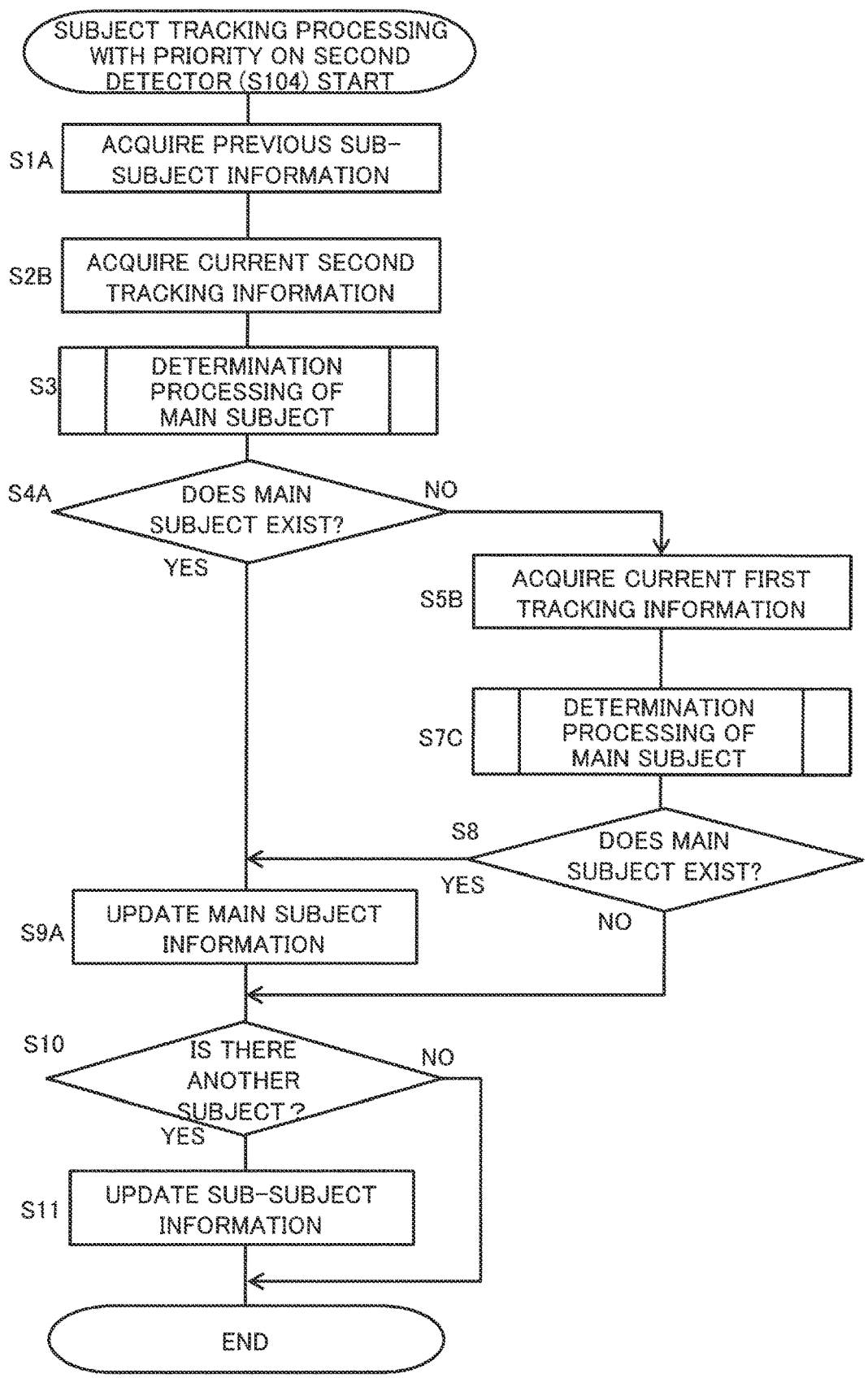
FIG. 19 is a flowchart illustrating subject tracking processing with priority on a second detector in the digital camera according to the third embodiment.

FIG. 19 is a flowchart illustrating the subject tracking processing with priority on the second detector (S104) in the digital camera 100 of the present embodiment. Each process of this flowchart is performed by the controller 135, for example, similarly to the subject tracking processing with priority on the first detector (S103) illustrated in FIG. 18. Differences from FIG. 18 will be described below.

First, the controller 135 acquires the head tracking information D4 (second tracking information) instead of Step S2A in FIG. 18 (S2B). When there is no main subject in the head tracking information D4 (NO in S4A), the controller 135 acquires the face tracking information D2 (first tracking information) (S5B).

Thereafter, the controller 135 proceeds to a main subject determination process (S7C). In the processing of Step S7C, since the detector information in the previous main subject information D0 indicates the head recognizer 124 (second detector) (NO in S102), the same processes as those of Step S92 and subsequent steps in the processing of Step S7A in FIG. 15 are performed.

According to the subject tracking processing with priority on the first detector (S103) and the subject tracking processing with priority on the second detector (S104), the main subject can be tracked by preferentially using the tracking result of each of the face recognizer 122 and the head recognizer 124, respectively, for example.

3-3. Effects and the Like

As described above, the digital camera 100 of the third embodiment is an example of the image tracking apparatus that tracks a subject in a moving image in which the subject is captured The digital camera 100 includes the image sensor 115 (image acquisition device), the face recognizer 122 (first detector), the head recognizer 124 (second detector), and the controller 135 (control unit). The image sensor 115 acquires image data indicating the moving image. The face recognizer 122 detects a face area (first area) corresponding to a face of at least one subject in acquired image data to track the face area in the moving image (S61 to S70). The head recognizer 124 detects the head area (second area) of at least one subject in the image data to track the head area in the moving image (S61A to S70A). The controller 135 tracks the subject by switching between a tracking result of the face area by the face recognizer 122 and a tracking result of the head area by the head recognizer 124. The execution period of the face recognizer 122 (operation period in which the first detector detects the first area) and the execution period of the head recognizer 124 (operation period in which the second detector detects the second area) are the same. The controller 135 tracks the subject using the tracking result of the face recognizer 122 when the face area is tracked by the face recognizer 122 (S103). The controller 135 tracks the subject using the tracking result of the head recognizer 124 when the face area is not tracked by the face recognizer 122 and the head area is tracked by the head recognizer 124 (S104). After switching to the tracking result of the head recognizer 124, the controller 135 continues tracking the subject using the tracking result of the head recognizer 124 when the face area is tracked by the face recognizer 122 the head area is tracked by the head recognizer 124 (S101 to S104).

According to the above digital camera 100, the respective detectors operate in the same execution period, and while the subject is being continuously tracked by the head recognizer 124, the tracking result used for tracking the subject is not switched to that of the face recognizer 122. As a result, when a subject is tracked by any of the detectors, the subject can be tracked with high accuracy without making a comparison or the like to determine the identity of the subject between tracking results of different detectors, for example.

When the face area is tracked by the face recognizer 122 after switching to the use of the tracking result of the head recognizer 124 (S104), the controller 135 does not switch from the tracking result of the head recognizer 124 to the tracking result of the face recognizer 122 upon tracking the head area by the head recognizer 124 (YES in S4A). While the controller 135 switches from the tracking result of the head recognizer 124 to the tracking result of the face recognizer 122 (S9A) upon lost of the head area by the head recognizer 124 (NO in S4A). As a result, the subject can be continuously tracked even when the subject is lost by the head recognizer 124, suppressing the frequency of switching between the tracking results of the respective detectors.

Other Embodiments

As described above, the first to third embodiments are described as examples of the technique disclosed in the present application. However, the technique of the present disclosure is not limited thereto, and is also applicable to embodiments obtained by appropriately performing changes, replacements, additions, omissions, and the like. In addition, it is possible to combine the respective constituent elements described in each of the above embodiments to obtain a new embodiment.

In each of the above embodiments, the face recognizer 122 that sets the face area as the tracking target when the face area is continuously detected twice or more in the face tracking processing, is described. In the present embodiment, the face recognizer 122 may set a face area as the tracking target when the face area is continuously detected a predetermined number of times or more. The predetermined number of times is the number of times more than twice that is set in advance according to the accuracy, period, or the like of face detection, for example. In this case, the face recognizer 122 may hold the number of times that the face area is detected in Step S62 and is determined as the same face area in Step S66, associating with the face area in the face recognition information D22, for example. Then the face recognizer 122 may turn on a tracking flag of a face area with the number of times that is equal to or more than the predetermined number of times. A head area to be tracked may also be similarly determined in the head recognizer 124 of the present embodiment, instead of the face area in the face tracking processing described above.

The description is given in each of the above embodiments regarding the face recognizer 122, which sets the face area continuously detected twice or more, as the tracking target using the face recognition information D22 in which the tracking flag is associated with the face area in the face tracking processing. The face recognizer 122 of the present embodiment may update the face tracking information D2 with a detected face area as a tracking target without using the face recognition information D22 in the face tracking processing. The head tracking information D4 may also be updated with a detected head area as a tracking target in the head recognizer 124 of the present embodiment, similarity to the face tracking processing describe above, replacing the face area in the face tracking processing.

In each of the above embodiments, the digital camera 100 used for AF control by continuously identifying the main subject through the subject tracking processing is described. In the present embodiment, the digital camera 100 may perform white balance (WB) control and/or automatic exposure (AE) based on the tracking of the main subject without being limited to the AF control.

In each of the above embodiments, the digital camera 100 that tracks the subject by performing the image recognition on the captured image Im such as the through image is described. In the present embodiment, the digital camera 100 may perform image recognition on image data stored in the memory card 142 in the past and apply subject tracking processing.

The digital camera 100 including the optical system 110 and the lens driver 112 is exemplified in each of the above embodiments. The image tracking apparatus of the present embodiment do not necessarily include the optical system 110 and the lens driver 112, and may bean interchangeable lens camera, for example.

Although the digital camera is described as an example of the image tracking apparatus in each of the above embodiments, the disclosure is not limited thereto. The image tracking apparatus of the present disclosure may be an electronic device (e.g., a video camera, a smartphone, a tablet terminal, or the like) having an image acquisition function.

In each of the above embodiments, the digital camera 100 in which the image acquisition device is configured using the image sensor 115 as the imager is described as an example of the image tracking apparatus. In the present embodiment, the image tracking apparatus may be an information processing apparatus having an image acquisition device configured as an interface circuit that receives image data, for example. The information processing apparatus is, for example, a PC. In the present embodiment, the image tracking apparatus may apply processing such as subject tracking to image data received from an image sensor outside the tracking apparatus via the interface circuit, for example.

As described above, the above-described embodiments are described as examples of techniques in the present disclosure. To this extent, the attached drawings and detailed descriptions are provided.

Therefore, components described in the attached drawings and the detailed description include not only components indispensable to solve the problem, but may also include components not necessarily indispensable to solve the problem in order to provide examples of the techniques. Therefore, those components not necessarily indispensable should not be deemed essential due to the mere fact that those components not necessarily indispensable are described in the attached drawings and the detailed description.

In addition, since the above-described embodiments are given as the examples of the techniques according to the present disclosure, various modifications, replacements, additions, omissions, or the like can be made within the scope of the claims or in a scope equivalent to the scope of the claims.

The present disclosure is applicable to an image tracking apparatus that tracks a subject in image data.

The invention claimed is:

1. An image tracking apparatus, which tracks a subject in a moving image in which the subject is captured, comprising:
   an image acquisition device that acquires image data indicating the moving image;
   a first detector that detects a first area of at least one subject in acquired image data to track the first area in the moving image;
   a second detector that detects a second area of at least one subject in the image data to track the second area in the moving image; and
   a controller that tracks the subject by switching between a tracking result of the first area by the first detector and a tracking result of the second area by the second detector,
   wherein the first detector and the second detector operate independently of each other whereby the first detector detects the first area independent of the second detector detecting the second area, and the second detector detects the second area independent of the first detector detecting the first area, and
   wherein the controller
   tracks the subject using the tracking result of the first detector when the first area is tracked by the first detector, and
   tracks the subject using the tracking result of the second detector when the first area is not tracked by the first detector and the second area is tracked by the second detector.

2. The image tracking apparatus according to claim 1, wherein
   in response to loss of the first area by the first detector, the controller determines whether the first area and the second area indicate an identical subject based on a positional relation between the first area and the second area, and
   upon determining that the first and second areas indicate the identical subject, the controller switches from the tracking result of the first detector to the tracking result of the second detector.

3. The image tracking apparatus according to claim 2, wherein
   after switching to the tracking result of the second detector, the controller switches from the tracking result of the second detector to the tracking result of the first detector upon tracking the first area by the first detector.

4. The image tracking apparatus according to claim 1, wherein
   an operation period with which the first detector detects the first area of the subject is shorter than an operation period with which the second detector detects the second area of the subject.

5. The image tracking apparatus according to claim 1, wherein
   the first detector detects a face area corresponding to a face of the subject to track the face area in the moving image, and
   the second detector detects a head area corresponding to a head including a face of the subject to track the head area in the moving image.

6. The image tracking apparatus according to claim 5, wherein upon switching from the tracking result of the first detector to the tracking result of the second detector, the controller tracks the subject by using the tracking result of the second detector according to positional relation that the face area is included in the head area.

7. The image tracking apparatus according to claim 5, wherein upon switching from the tracking result of the second detector to the tracking result of the first detector, the controller tracks the subject by using the tracking result of the first detector according to positional relation that the face area is included in the head area.

8. The image tracking apparatus according to claim 5, wherein
the first detector tracks each of face areas of a plurality of subjects, and/or the second detector tracks each of head areas of the plurality of subjects, and
the controller tracks a main subject and one or more other subjects in the plurality of subjects respectively, based on tracking results of the first detector and tracking results of the second detector.

9. The image tracking apparatus according to claim 5, further comprising
an operation interface that inputs a user operation to set a main subject,
wherein
the controller manages main subject information based on the tracking results of the first and second detectors to track the main subject in the moving image, the main subject information identifying the main subject in the image data, and
in response to input of a user operation to change the main subject in a state where a plurality of areas corresponding to the plurality of subjects are tracked by the first and second detectors,
the controller updates the main subject information to replace information identifying the main subject before changed with information identifying the main subject after changed, based on the tracking results of the first or second detector at the input of the user operation.

10. The image tracking apparatus according to claim 5, wherein
the tracking result of the first detector includes a position and a size of the face area in the image data, and the tracking result of the second detector includes a position and a size of the head area in the image data.

11. An image tracking apparatus, which tracks a subject in a moving image in which the subject is captured, comprising:
an image acquisition device that acquires image data indicating the moving image;
a plurality of detectors each of which detects an area of at least one subject in acquired image data to track the detected area in the moving image; and
a controller that tracks the subject by switching among tracking results of the areas of the subject obtained by each of the plurality of detectors,
wherein
the plurality of detectors include at least a first detector that detects a first area as an area of the subject and a second detector that detects a second area as an area of the subject, and
first operation period which is a cyclic period for the first detector to execute detection of the first area is shorter than second operation period which is a cyclic period for the second detector to execute detection of the second area, and
wherein the controller
tracks the subject using a tracking result of the first detector when the first area is tracked by the first detector,
tracks the subject using a tracking result of the second detector when the first area is not tracked by the first detector and the second area is tracked by the second detector, and
wherein after switching to the tracking result of the second detector, the controller switches from the tracking result of the second detector operating in the second operation period to the tracking result of the first detector upon tracking the first area by the first detector operating in the first operation period.

12. The image tracking apparatus according to claim 11, wherein
the plurality of detectors include a third detector that detects a third area different from the first and second areas as an area of the subject, and
an operation period with which the third detector detects the third area is longer than the operation period with which the second detector detects the second area, and
wherein the controller tracks the subject using a tracking result of the third detector when the second area is not tracked by the second detector and the third area is tracked by the third detector.

13. The image tracking apparatus according to claim 12, wherein
the controller
switches from the tracking result of the first detector to the tracking result of the second detector upon loss of the first area by the first detector,
switches from the tracking result of the second detector to the tracking result of the third detector upon loss of the second area by the second detector, and
wherein after switching to the tracking result of the third detector, the controller switches from the tracking result of the third detector to the tracking result of the first detector upon tracking the first area by the first detector.

14. An image tracking apparatus, which tracks a subject in a moving image in which the subject is captured, comprising:
an image acquisition device that acquires image data indicating the moving image;
a first detector that detects a first area of at least one subject in acquired image data to track the first area in the moving image;
a second detector that detects a second area of at least one subject in the image data to track the second area in the moving image; and
a controller that tracks the subject by switching between a tracking result of the first area by the first detector and a tracking result of the second area by the second detector,
wherein an operation period which is a cyclic period for the first detector to execute detection of the first area and an operation period which is a cyclic period for the second detector to execute detection of the second area are the same, and
wherein the controller
tracks the subject using a tracking result of the first detector when the first area is tracked by the first detector,
tracks the subject using a tracking result of the second detector when the first area is not tracked by the first detector and the second area is tracked by the second detector, and
wherein after switching to the tracking result of the second detector, the controller continues tracking the subject using the tracking result of the second detector when the first area is tracked by the first detector with the second detector tracking the second area.

15. The image tracking apparatus according to claim 14, wherein
when the first area is tracked by the first detector after switching to the tracking result of the second detector,
the controller
does not switch from the tracking result of the second detector to the tracking result of the first detector upon tracking the second area by the second detector, and
switches from the tracking result of the second detector to the tracking result of the first detector upon lost of the second area by the second detector.

\* \* \* \* \*